US012686174B2

(12) United States Patent
Liu et al.

(10) Patent No.: US 12,686,174 B2
(45) Date of Patent: Jul. 21, 2026

(54) OBJECT SHOVELING MECHANISM, 3D PRINTER AND 3D PRINTING METHOD

(71) Applicant: GUANGZHOU HEYGEARS IMC. INC, Guangzhou (CN)

(72) Inventors: Junhua Liu, Guangzhou (CN); Jiajing Zhou, Guangzhou (CN); Qingshan Liu, Guangzhou (CN); Shutian Su, Guangzhou (CN); Bingliang Huang, Guangzhou (CN); Kaiwu Li, Guangzhou (CN)

(73) Assignee: GUANGZHOU HEYGEARS IMC. INC, Guangzhou (CN)

( * ) Notice: Subject to any disclaimer, the term of this patent is extended or adjusted under 35 U.S.C. 154(b) by 14 days.

(21) Appl. No.: 18/716,503

(22) PCT Filed: Nov. 15, 2022

(86) PCT No.: PCT/CN2022/131986
§ 371 (c)(1),
(2) Date: Jun. 4, 2024

(87) PCT Pub. No.: WO2023/207034
PCT Pub. Date: Nov. 2, 2023

(65) Prior Publication Data
US 2025/0033286 A1      Jan. 30, 2025

(30) Foreign Application Priority Data

Apr. 26, 2022   (CN) ......................... 202210450161.5
Apr. 26, 2022   (CN) ......................... 202210450163.4
Apr. 26, 2022   (CN) ......................... 202210450165.3

(51) Int. Cl.
B29C 64/245        (2017.01)
B29C 64/124        (2017.01)
(Continued)

(52) U.S. Cl.
CPC .......... B29C 64/379 (2017.08); B29C 64/124 (2017.08); B29C 64/245 (2017.08);
(Continued)

(58) Field of Classification Search
CPC ... B29C 64/124; B29C 64/129; B29C 64/135; B29C 64/214; B29C 64/245;
(Continued)

(56) References Cited

U.S. PATENT DOCUMENTS 7,520,740 B2      4/2009   Wahlstrom
11,155,028 B1    10/2021   Zhang
(Continued)

FOREIGN PATENT DOCUMENTS

CN          111267343 A        6/2020
CN          112549539 A        3/2021
(Continued)

OTHER PUBLICATIONS

The first office action of counterpart EP application No. 2293985.0 issued on Jul. 8, 2025.

*Primary Examiner* — JaMel M Nelson
(74) *Attorney, Agent, or Firm* — The Sun IP Law

(57)                    ABSTRACT

The disclosure provides an object shoveling mechanism, a 3D printer and a 3D printing method, and relates to the technical field of printing. The object shoveling mechanism is applied to the 3D printer. The 3D printer includes a forming platform, provided with a forming surface. The object shoveling mechanism includes an object shoveling assembly and an object receiving assembly, wherein the object shoveling assembly includes a shoveling tool and an object shoveling driving assembly, the shoveling tool being configured to strip a printed object from the forming surface, and the object shoveling driving assembly being configured to drive at least one of the shoveling tool and the forming
(Continued)

platform, so that the shoveling tool and the forming platform move relatively to strip the printed object from the forming surface through the shoveling tool; and the object receiving assembly includes a carrying element and an object receiving driving assembly, wherein the carrying element is provided with an object receiving position and configured to receive the printed object remove from the forming surface at the object receiving position, and the object receiving driving assembly is configured to drive the carrying element to move to the object receiving position. According to the object shoveling mechanism, the printer may operate unattended, the labor cost is reduced, and the printing efficiency is improved.

25 Claims, 13 Drawing Sheets

(51) Int. Cl.
| | |
|---|---|
| *B29C 64/379* | (2017.01) |
| *B33Y 10/00* | (2015.01) |
| *B33Y 30/00* | (2015.01) |
| *B33Y 40/00* | (2020.01) |

(52) U.S. Cl.
CPC .............. *B33Y 10/00* (2014.12); *B33Y 30/00* (2014.12); *B33Y 40/00* (2014.12)

(58) Field of Classification Search
CPC ....... B29C 64/379; B33Y 10/00; B33Y 30/00; B33Y 40/00; B33Y 40/20
See application file for complete search history.

(56) References Cited

U.S. PATENT DOCUMENTS

| | | | |
|---|---|---|---|
| 2007/0075460 A1* | 4/2007 | Wahlstrom | ............ B29C 64/182 |
| | | | 264/401 |
| 2017/0246851 A1 | 8/2017 | Kritchman | |
| 2021/0299952 A1 | 9/2021 | Xia et al. | |

FOREIGN PATENT DOCUMENTS

| | | | |
|---|---|---|---|
| CN | 213383012 U | | 6/2021 |
| CN | 113370525 A | | 9/2021 |
| CN | 214324201 U | | 10/2021 |
| CN | 214395448 U | | 10/2021 |
| CN | 214983200 U | | 12/2021 |
| CN | 215151900 U | | 12/2021 |
| CN | 215320688 U | | 12/2021 |
| CN | 114147967 A | | 3/2022 |
| CN | 114228151 A | | 3/2022 |
| CN | 114347463 A | | 4/2022 |
| CN | 216257533 U | | 4/2022 |
| CN | 114734637 A | | 7/2022 |
| CN | 114734639 A | | 7/2022 |
| CN | 114770947 A | | 7/2022 |
| CN | 112549539 B | * | 9/2022 |

* cited by examiner

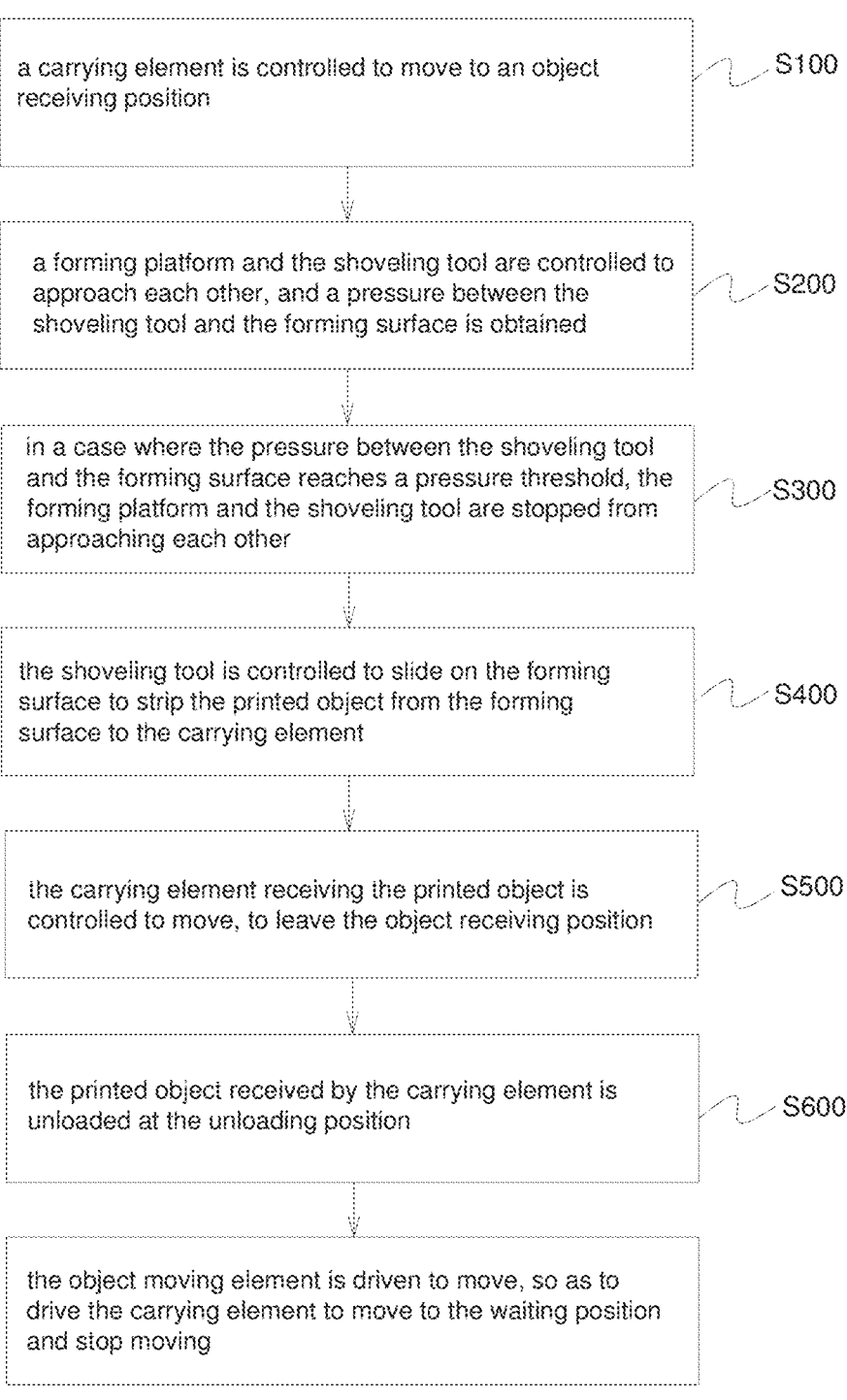

a carrying element is controlled to move to an object receiving position — S100 a forming platform and the shoveling tool are controlled to approach each other, and a pressure between the shoveling tool and the forming surface is obtained — S200 in a case where the pressure between the shoveling tool and the forming surface reaches a pressure threshold, the forming platform and the shoveling tool are stopped from approaching each other — S300 the shoveling tool is controlled to slide on the forming surface to strip the printed object from the forming surface to the carrying element — S400 the carrying element receiving the printed object is controlled to move, to leave the object receiving position — S500 the printed object received by the carrying element is unloaded at the unloading position — S600 the object moving element is driven to move, so as to drive the carrying element to move to the waiting position and stop moving

Fig. 28

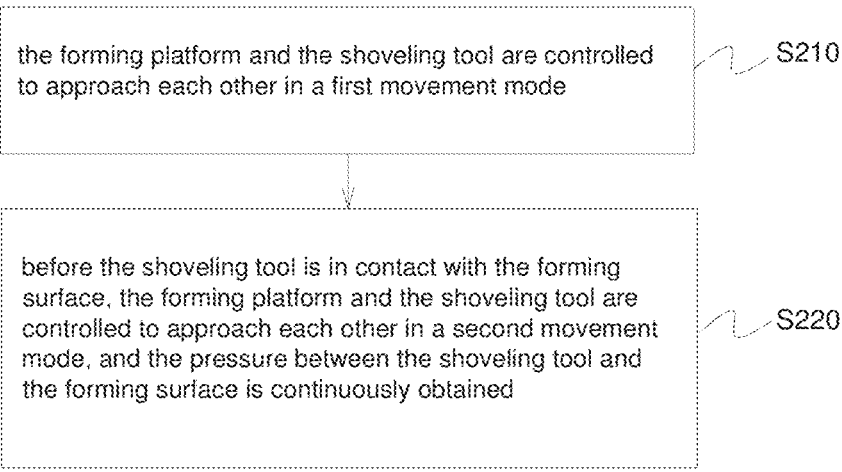

the forming platform and the shoveling tool are controlled to approach each other in a first movement mode ⟋ S210 before the shoveling tool is in contact with the forming surface, the forming platform and the shoveling tool are controlled to approach each other in a second movement mode, and the pressure between the shoveling tool and the forming surface is continuously obtained ⟋ S220

Fig. 29

OBJECT SHOVELING MECHANISM, 3D PRINTER AND 3D PRINTING METHOD

CROSS-REFERENCE TO RELATED APPLICATION

The disclosure claims priority to Chinese Patent Application No. 202210450165.3, 202210450163.4 and 202210450161.5, filed to the China National Intellectual Property Administration on Apr. 26, 2022 and entitled "Object shoveling Mechanism, 3D Printer and 3D Printing Method", "Transfer Liquid Adding Apparatus, Automatic Liquid Adding Apparatus, 3D Printer and Liquid Adding Method" and "Printed object Processing Method of 3D Printer and 3D Printer" respectively, the disclosures of which are hereby incorporated by reference in their entirety.

TECHNICAL FIELD

The disclosure relates to the technical field of 3D printing, in particular to an object shoveling mechanism, a 3D printer and a 3D printing method.

BACKGROUND

After the completion of 3D printing, that is, after a print material is cured on a forming platform to form a printed object, the solid three-dimensional printed object is held on the forming platform, and the uncured print material remains attached to the cured printed object. In the existing 3D printing process, manual object shoveling is often used to separate the printed object from the forming platform. However, when removing the printed object from the forming platform, there is a risk of contamination of the uncured print material attached to the printed object to an operator, or contamination to a device when the operator removes the printed object. In addition, after one-time printing is completed, a machine needs to be paused to wait for manually stripping the printed object with a flat shovel, which is inefficient and cannot guarantee consistency, resulting in unstable quality of the printed object.

SUMMARY

The disclosure aims to provide an object shoveling mechanism, a 3D printer and a 3D printing method, which enable the printer to automatically remove a manufactured 3D printed object in a standardized manner, so that the efficiency of a printing operation is relatively high and the quality of the printed object is well guaranteed.

Embodiments of the disclosure are implemented as follows.

In a first aspect, the disclosure provides an object shoveling mechanism, which is applied to a 3D printer. The 3D printer includes a forming platform, the forming platform having a forming surface, and the forming surface being configured for attachment of a printed object. The object shoveling mechanism includes an object shoveling assembly and an object receiving assembly. The object shoveling assembly includes a shoveling tool and an object shoveling driving assembly, the shoveling tool being configured to strip the printed object from the forming surface, and the object shoveling driving assembly being configured to drive at least one of the shoveling tool and the forming platform such that the shoveling tool and the forming platform move relative to each other to remove the printed object from the forming surface through the shoveling tool. The object receiving assembly includes a carrying element and an object receiving driving assembly, the carrying element being provided with an object receiving position and configured to receive the printed object stripped from the forming surface at the object receiving position, and the object receiving driving assembly being configured to drive the carrying element to move to the object receiving position.

In a second aspect, the disclosure provides a 3D printer, which includes the object shoveling mechanism in the second aspect. The 3D printer further includes a tray and a forming platform. The tray is configured to accommodate a print material, the forming platform is provided with a forming surface and configured to adhere the print material to the forming surface layer by layer to obtain a printed object, wherein the object shoveling mechanism is located between the tray and the forming platform.

In a third aspect, the disclosure provides a 3D printing method, which is applied to a 3D printer. The 3D printer includes a forming platform, a carrying element and a shoveling tool, the forming platform being provided with a forming surface configured for attachment of a printed object, and the carrying element being provided with an object receiving position. The 3D printing method includes: controlling the carrying element to move to the object receiving position; controlling the shoveling tool to slide on the forming surface to strip the printed object from the forming surface and receive it by the carrying element; and controlling the carrying element receiving the printed object to move away from the object receiving position.

The embodiments of the disclosure have the following beneficial effects.

The object shoveling mechanism provided by the disclosure includes the object shoveling assembly and the object receiving assembly, the object shoveling assembly being configured to strip the printed object from the forming surface, and the object receiving assembly being configured to receive the printed object at the object receiving position and unload the printed object at the object receiving position. The 3D printer provided by the disclosure includes the forming platform, the tray and the above object shoveling mechanism. The 3D printer provided by the disclosure implements the above 3D printing method, and therefore also has the beneficial effects of being high in operation efficiency, reducing the contamination of the print material to a human body or a device, and achieving the unattended printing operation.

The 3D printing method provided by the disclosure includes: controlling the carrying element to move to the object receiving position, controlling the shoveling tool to slide on the forming surface to strip the printed object from the forming surface and receive it by the carrying element, and controlling the carrying element receiving the printed object to move away from the object receiving position. The 3D printing method realizes the automatical operation of stripping the printed object from the forming platform, and improves the printing efficiency. According to the method, the contamination to the human body or the device caused by manual object shoveling is avoided. At the same time, because the whole process of shoveling, receiving and unloading the printed object of the 3D printing method is realized by automatic operation, the printer may operate unattended, and the labor cost is reduced.

BRIEF DESCRIPTION OF THE DRAWINGS

In order to more clearly illustrate the embodiments of the disclosure, the drawings used in the embodiments will be briefly described below. It is to be understood that the following drawings are only some embodiments of the disclosure and should not be regarded as a limitation of the scope. Other related drawings may further be obtained by those of ordinary skill in the art according to these drawings without creative efforts.

FIG. 28 is a flowchart of a 3D printing method according to an embodiment the disclosure.

FIG. 29 is a flowchart of controlling a forming platform and a shoveling tool to approach each other and obtaining a pressure between a shoveling tool and the forming surface according to an embodiment of the disclosure.

Figure 1:
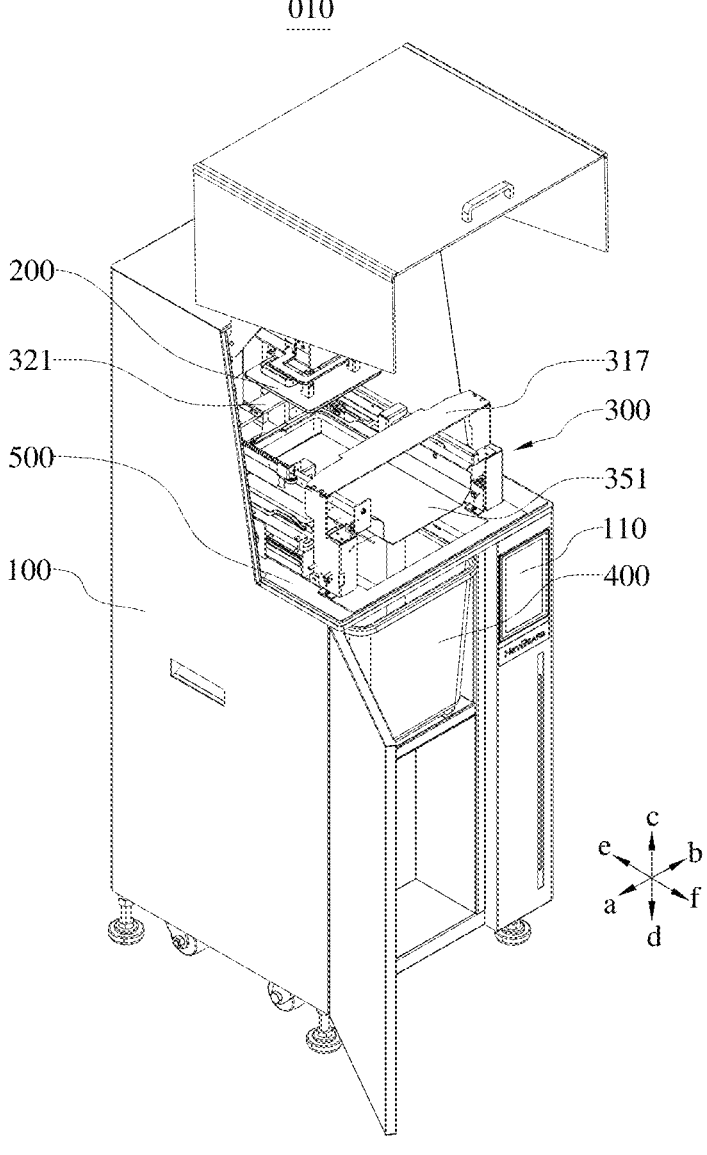
FIG. 1 is an overall schematic diagram of a 3D printer according to an embodiment of the disclosure.

Reference signs: 010—printer; 020—printed object; 100—cabinet; 110—operating mechanism; 200—forming platform; 210—forming surface; 220—platform tag; 230—platform reader; 300—object shoveling mechanism; 310—object shoveling assembly; 320—shoveling tool assembly; 321—shoveling tool; 3211—edge; 3212—first surface; 3213—second surface; 3214—slope surface; 322—tool holder; 323—adjusting assembly; 3231—first elastic element; 3232—adjusting element; 324—blocking element; 325—shoveling tool tag; 326—shield; 330—object shoveling driving assembly; 331—power module; 332—transmission module; 333—power receiving unit; 3331—drive wheel; 3332—driven wheel; 3333—transmission belt; 334—transmission shaft; 335—synchronous transmission unit; 3351—transmission wheel; 3352—synchronous wheel; 3353—synchronous belt; 336—slide rail; 337—sliding seat; 338—slide block; 339—transmission block; 340—shoveling tool reader; 350—object receiving assembly; 351—carrying element; 3511—unloading opening; 3512—second magnetic part; 352—object receiving driving assembly; 3521—lead screw; 3522—object receiving driving element; 353—carrying element track; 354—object moving element; 3541—object moving element; 3542—first magnetic part; 355—object moving element track; 360—first sensor; 361—second sensor; 362—object receiving position sensor; 363—object moving completion sensor; 364—carrying element sensor; 365—printed object sensor; 400—storager; 500—substrate; 510—transparent area; 520—object receiving hole; 530—avoidance through hole; 540—floating mechanism; 541—floating element; 5411—first through hole; 5412—limiting groove; 542—guide shaft; 5421—limiting part; 543—abutting element; 5431—top surface; 544—second elastic element; 545—first magnetic attraction element; 546—adjusting plate; 5461—second through hole; 5462—adjusting screw hole; 547—connection screw; 548—adjusting screw; 549—third elastic element; 550—guide press block; 560—magnet; 700—tray; 710—tray tag; 720—tray reader; 730—flange; 800—platform driving mechanism; 900—automatic liquid adding mechanism; 910—transfer liquid adding assembly; 920—feeding box; 921—feeding box body; 922—liquid outlet part; 923—discharge pipe; 924—first fixed support; 925—second fixed support; 926—fool-proofing element; 9261—positioning hole; 9262—positioning pin; 930—locking assembly; 931—blocking element; 9311—baffle plate; 9312—connecting plate; 9313—abutting part; 9314—sealing plug; 932—slider; 933—bolt; 934—transmission rod; 940—liquid adding driving assembly; 950—storage mechanism; 951—liquid storage bottle; 952—check valve.

DETAILED DESCRIPTION OF THE EMBODIMENTS

In order to make the objects, technical solutions and advantages of the embodiments of the disclosure clearer, the technical solutions in the embodiments of the disclosure will be clearly and completely described in conjunction with the drawings in the embodiments of the disclosure. It is apparent that the described embodiment is only a part of the embodiments of the disclosure, and not all of them. Components of the embodiments of the disclosure generally described and illustrated in the drawings herein may be arranged and designed in a variety of different configurations.

Therefore, the following detailed description of the embodiments of the disclosure provided in the accompanying drawings is not intended to limit the scope of the claimed disclosure, but only represents the selected embodiments of the disclosure. All other embodiments obtained by those of ordinary skill in the art based on the embodiments of the disclosure without creative efforts are within the scope of protection of the disclosure.

It is to be noted that: similar reference signs and letters refer to similar items in the following drawings, so that once a certain item is defined in one drawing, it does not need to be further defined and explained in the subsequent drawings.

In the description of the disclosure, it is to be noted that the orientations or positional relationships indicated by the terms "upper", "down", "inside", "outside", etc. are based on the orientations or positional relationships shown in the drawings, or the orientations or positional relationships that are conventionally placed when the disclosure product is used, and are only for the convenience of describing the disclosure and simplifying the description. The description does not indicate or imply that the apparatus or element referred to must have a specific orientation, be constructed and operated in a specific orientation, and therefore cannot be construed as limiting the disclosure.

In addition, the terms "first", "second", "third" and the like are used for distinguishing the description only, and cannot be understood as indicating or implying relative importance.

It is to be noted that the features in the embodiments of the disclosure may be combined with each other without conflict.

A three-dimensional printed object is printed on a forming platform layer by layer by a 3D printer in the related art using a curable print material. After the printed object is printed, it is necessary to remove the printed object from the forming platform. Currently, a method of manual object shoveling is adopted, and an operator shovels the printed object from the forming platform through holding a shovel blade. This manner has the following defects.

(1) The printer requires a person to be on duty. After one printed object is printed, the printed object must be manually shoveled before the next one is printed, so that the labor cost is relatively high and the efficiency of a printing operation is relatively low.

(2) Manual object shoveling is difficult to ensure the consistency of object shoveling operations, and the object shoveling operations are difficult to be standardized, so that the quality of the printed object cannot be guaranteed.

(3) A print material that is not fully cured is still attached to a surface of the printed object that has just been completed, the operator is likely to be in contact with these uncured print materials to cause a human body to be contaminated by the print material, and there is also a risk of contamination in the printer during an object shoveling process.

In order to improve at least one of the above defects in the related art, the embodiments of the disclosure provide an object shoveling mechanism, a 3D printer and a 3D printing method, which can automatically separate a printed object on a forming platform, avoid manual object shoveling, and realize standardized object shoveling operations, so as to be conductive to improving the efficiency, reducing the labor cost and avoiding contamination to a human body and a device.

In order to facilitate the understanding of the 3D printing method provided by the embodiments of the disclosure, the 3D printer provided by the embodiments of the disclosure is first introduced below.

Figure 2:
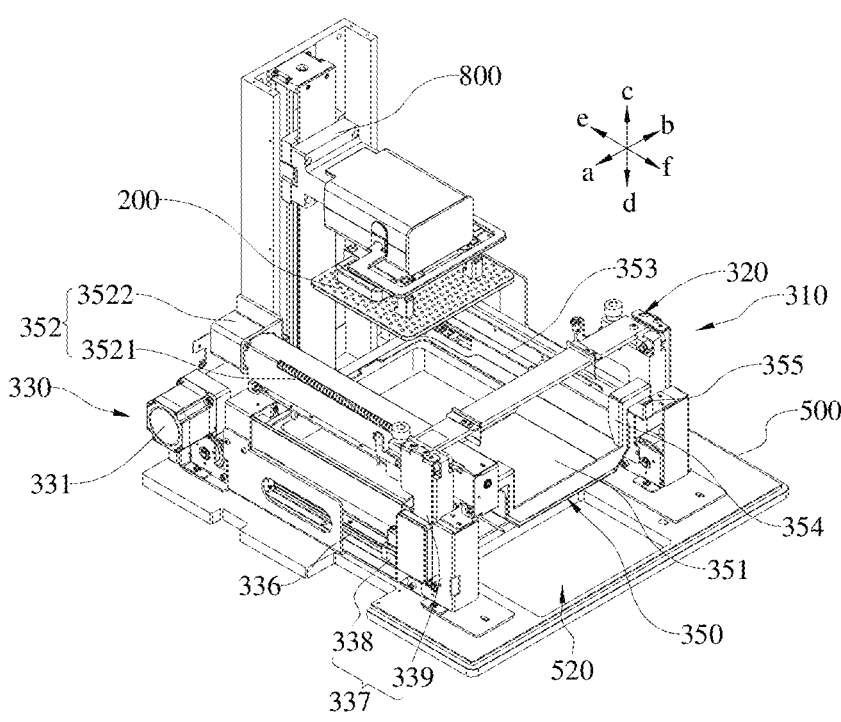
FIG. 2 shows cooperation between a forming platform and an object shoveling mechanism according to an embodiment of the disclosure.
Figure 3:
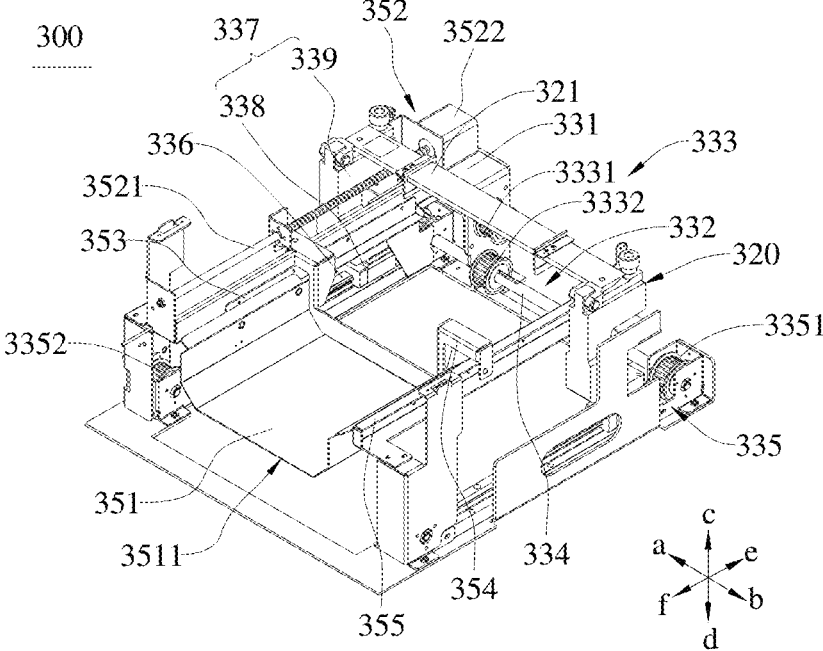
FIG. 3 is a first schematic diagram of an object shoveling mechanism according to an embodiment of the disclosure.
Figure 4:
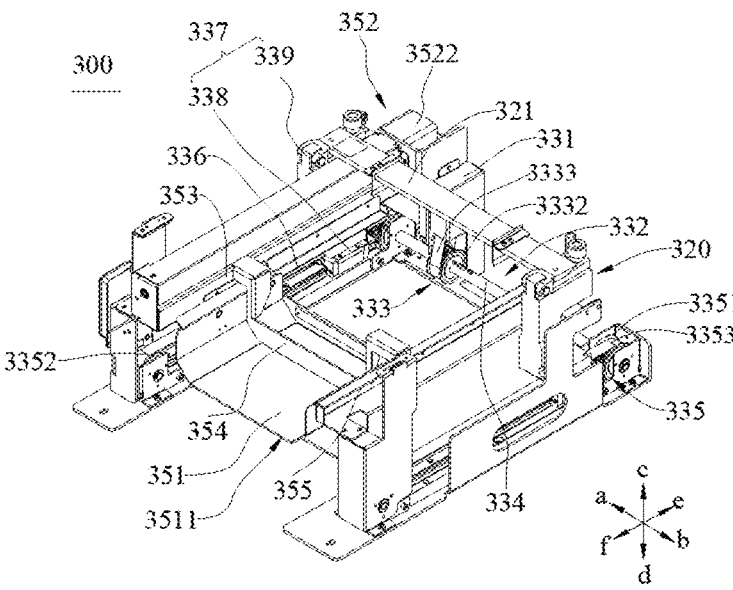
FIG. 4 is a second schematic diagram of an object shoveling mechanism according to an embodiment of the disclosure.

FIG. 1 is an overall schematic diagram of a 3D printer 010 according to an embodiment of the disclosure, and FIG. 2 shows cooperation between a forming platform 200 and an object shoveling mechanism 300 according to an embodiment of the disclosure. As shown in FIG. 1 and FIG. 2, the 3D printer 010 (hereafter referred to as the printer 010) provided by the embodiments of the disclosure may include a cabinet 100, and a forming platform 200, an object shoveling mechanism 300, a substrate 500, a lighting mechanism (not shown in the figure), a tray 700 (shown in FIG. 19) and a platform driving mechanism 800 which are arranged in the cabinet 100. The forming platform 200 and the tray 700 may be arranged on one side of the substrate 500, and the lighting mechanism may be arranged on the other side of the substrate 500. In the embodiment, various mechanisms of the 3D printer 010 cooperate to shape a print material into a required printed object.

In the embodiments of the disclosure, the forming platform 200 may be provided with a forming surface 210 (shown in FIG. 10a), the forming surface 210 may be configured for attachment of the printed object, and the platform driving mechanism 800 may be configured to drive the forming platform 200 to move. In the embodiment, the platform driving mechanism 800 may be configured to drive the forming platform 200 to move in a first direction (i.e., a direction indicated by an arrow c, d in the figure), and a moving path of the forming platform 200 may be linear. Specifically, the first direction may be perpendicular to a main surface of the substrate 500, and the forming surface 210 of the forming platform 200 may be a lower surface of the forming platform 200, and may be opposite to the main surface of the substrate 500. During the printing process, the printed object may be cured on the forming surface 210 layer by layer, and the forming platform 200 gradually ascends with the layer-by-layer formation of the printed object.

Figure 19:
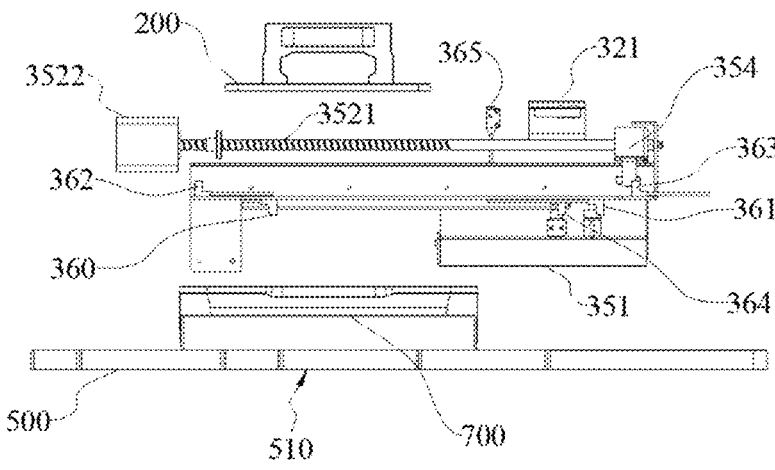
FIG. 19 shows a plurality of sensors of an object shoveling mechanism according to an embodiment of the disclosure.

Further referring to FIG. 19, the substrate 500 may be provided with a transparent area 510, the tray 700 may be placed corresponding to the transparent area 510, a part of the tray 700 corresponding to the transparent area 510 may be made of a transparent material, and the tray 700 may be configured to carry the print material. It is to be noted that the print material used by the printer 010 provided by the embodiments of the disclosure may be a liquid photosensitive material, such as a photosensitive resin. The print material may be cured by irradiation of light with a certain wavelength to form a solid printed object with a certain strength.

The lighting mechanism may be arranged below the substrate 500 corresponding to the transparent area 510, and may emit light capable of curing the print material. Accordingly, the tray 700 and the forming platform 200 may be located above the substrate 500.

During 3D printing, the platform driving mechanism 800 may drive the forming platform 200 to move close to the tray 700, and immerse the forming surface 210 into the print material carried by the tray 700, and the light emitted by the lighting mechanism is irradiated into the tray 700 through the transparent area 510, so that the print material located between the bottom of the tray 700 and the forming surface 210 is cured on the forming surface 210 of the forming platform 200, or on the previous layer of the print material that has been cured on the forming surface 210.

Further referring to FIG. 1 to FIG. 4 and FIG. 19, in an embodiment, the object shoveling mechanism 300 may be located between the forming platform 200 and the tray 700, and is configured to automatically strip the printed object from the forming surface 210 after printing is completed, so that the forming platform 200 may continue to print a next printed object, without the need for an operator to manually remove the forming platform 200 from the printer 010 for an object shoveling operation. Specifically, the object shoveling mechanism 300 may include an object shoveling assembly 310 and an object receiving assembly 350.

The object shoveling assembly 310 may include a shoveling tool assembly 320 and an object shoveling driving assembly 330. The shoveling tool assembly 320 may include a shoveling tool 321. The object shoveling driving assembly 330 is configured to drive at least one of the shoveling tool 321 and the forming platform 200, so that a relative movement of the shoveling tool 321 and the forming platform 200 enables the printed object to be stripped from the forming surface 210 through the shoveling tool 321. In the embodiment, the object shoveling driving assembly 330 is specifically configured to drive the shoveling tool 321 to move, so that the shoveling tool 321 slides on the forming surface 210 of the forming platform 200, thereby stripping the printed object that has been printed from the forming surface 210. Optionally, the object shoveling driving assembly 330 may drive the shoveling tool 321 to move linearly, and in the embodiment, the shoveling tool 321 may move in a second direction (a direction indicated by an arrow e, f in the figure). The second direction may be perpendicular to the first direction, and may be parallel to the forming surface 210.

In the embodiment, the shoveling tool 321 is a shovel blade with an edge, and the shovel blade has the advantages of high strength and good durability.

In an embodiment, the object shoveling driving assembly 330 may include a power module 331, a transmission module 332, a slide rail 336 and a sliding seat 337. The shoveling tool 321 may be mounted on the sliding seat 337, and the sliding seat 337 may be slidably connected to the slide rail 336. The transmission module 332 is in transmission connection with the power module 331 and the sliding seat 337 respectively, and is configured to receive power output by the power module 331 to drive the sliding seat 337 with the shoveling tool 321 to move along the slide rail 336. Specifically, the power module 331 may be a motor, such as a stepper motor, of course, may also be any other mechanism that provides the power.

The number of the slide rails 336 and the sliding seats 337 may be two, and the two slide rails 336 and the two sliding seats 337 are in one-to-one correspondence. The two slide rails 336 may be arranged in parallel and spaced apart, and the two sliding seats 337 may be respectively slidably connected to the corresponding slide rails 336.

Further, the shoveling tool 321 may be in the shape of a strip as a whole, a length direction thereof may be perpendicular to the first direction and the second direction, and both ends of the shoveling tool 321 in the length direction may be respectively mounted on the two sliding seats 337 spaced apart, which enables the shoveling tool to move smoothly under the drive of the two sliding seats 337.

In an embodiment, the transmission module 332 may include a power receiving unit 333 and a synchronous transmission unit 335. The power receiving unit 333 may be respectively connected to the power module 331 and the synchronous transmission unit 335 to receive the power output by the power module 331 and transmit the power to the synchronous transmission unit 335. The synchronous transmission unit 335 may be in transmission connection with the sliding seat 337 to drive the sliding seat 337 to slide on the slide rail 336, and the shoveling tool 321 is thus driven to move with the sliding seat.

Specifically, the power receiving unit 333 may include a drive wheel 3331, a transmission belt 3333 and a driven wheel 3332. The drive wheel 3331 may be connected to an output end of the power module 331, and the driven wheel 3332 may be connected to the drive wheel 3331 through the transmission belt 3333, so that the power output by the power module 331 may be successively transmitted to the drive wheel 3331 and the driven wheel 3332.

The synchronous transmission unit 335 may include a transmission shaft 334, two transmission wheels 3351, two synchronous wheels 3352 and two synchronous belts 3353. The two transmission wheels 3351, the two synchronous wheels 3352 and the two synchronous belts 3353 are in one-to-one correspondence, respectively. The driven wheel 3332 is sleeved on the periphery of the transmission shaft 334 and fixes to it, so that the transmission shaft 334 and the driven wheel 3332 rotate synchronously. The two transmission wheels 3351 are respectively sleeved on the periphery of both ends of the transmission shaft 334 and rotate synchronously with the transmission shaft 334. Further, the two synchronous wheels 3352 may be respectively connected to the corresponding transmission wheels 3351 through the corresponding synchronous belts 3353, so as to achieve synchronous rotation.

Further, each sliding seat 337 may be in transmission connection with the corresponding synchronous belt 3353, so as to slide in a direction defined by the slide rail 336 under the drive of the synchronous belt 3353, thereby achieving the synchronous movement of the shoveling tool 321.

In an implementation, a transmission manner of the transmission module 332 is transmission between a gear and a gear belt, and the sliding seat 337 may include a slide block 338. The slide block 338 may include a sawtooth-shaped engaging part, and may be engaged with sawteeth on the corresponding synchronous belt 3353 through the engaging part, so as to realize the transmission between the synchronous belt 3353 and the slide block 338. Further, the sliding seat 337 may further include a transmission block 339. The transmission block 339 is connected to the slide block 338 on one side and connected to the shoveling tool assembly 320 on the other side. The transmission block 339 is provided on a side of the slide block 338 proximate to the engaging part and a side of the synchronous belt 3353 away from the slide block 338, so that the synchronous belt 3353 is sandwiched between the slide block 338 and the transmission block 339. Specifically, the slide block 338 and the transmission block 339 may be connected by screws, and through the connection of the two, the synchronous belt 3353 arranged therebetween is pressed, so that the transmission between the engaging part and the synchronous belt 3353 is more reliable and not prone to looseness.

Of course, in other embodiments, the transmission may also not be performed in this manner. For example, in an embodiment, the power module 331 and the transmission module 332 may be a motor and a lead screw, respectively, and are further connected to the shoveling tool 321 or a mounting structure of the shoveling tool 321 through nuts, so that the shoveling tool 321 is capable of being driven. It is to be noted that, in this case, the shoveling tool 321 or the mounting structure of the shoveling tool 321 may be directly connected to the lead screw without the slide rail, so as to drive the shoveling tool 321 to move. The slide rail 336 similar to the above embodiment may also be arranged, at this time, the lead screw may be connected to the sliding seat 337 and configured to drive the sliding seat 337 to move along the slide rail 336, so as to drive the shoveling tool 321. Of course, at this time, the sliding seat 337 may not include the slide block 338 and the transmission block 339, and may be used as a whole structure, and the shoveling tool 321 or the mounting structure of the shoveling tool 321 may be directly mounted on the sliding seat 337.

Figure 5:
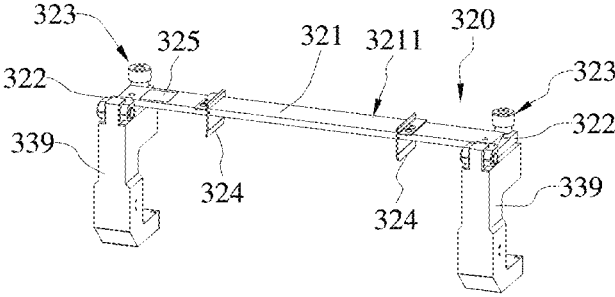
FIG. 5 is an assembly diagram of a shoveling tool assembly and a transmission block according to an embodiment of the disclosure.
Figure 6:
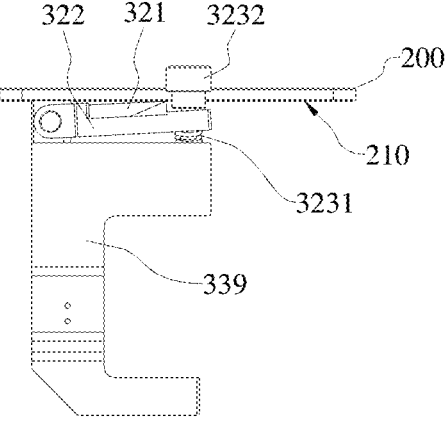
FIG. 6 shows contact between an object shoveling mechanism (partial) and a forming platform according to an embodiment of the disclosure.

FIG. 5 is an assembly diagram of a shoveling tool assembly 320 and a transmission block 339 according to an embodiment of the disclosure, and FIG. 6 shows contact between an object shoveling mechanism 300 (partial) and a forming platform 200 according to an embodiment of the disclosure. As shown in FIG. 5 and FIG. 6, in the embodiment, the shoveling tool assembly 320 may further include tool holders 322, and the shoveling tool 321 may be mounted on the transmission block 339 through the tool holders 322. Specifically, the number of the tool holders 322 may be two, and are in one-to-one correspondence to both ends of the shoveling tool 321 and the two transmission blocks 339, and the both ends of the shoveling tool 321 are respectively mounted on the corresponding two tool holders 322. Further, the two tool holders 322 may be respectively rotatably connected to the corresponding transmission blocks 339.

In the embodiment, an extension direction of a rotation axis of the two tool holders 322 relative to the transmission blocks 339 is parallel to the length direction of the shoveling tool 321, i.e., perpendicular to the direction of movement of the shoveling tool 321. Because the shoveling tool 321 in the embodiment is the shovel blade, by arranging a rotation direction of the tool holders 322 in this way, the shoveling tool 321 rotates around its length direction, so that the shoveling tool 321 allows adjusting an elevation angle. By adjusting the elevation angle of the shoveling tool 321, a feed angle of the shoveling tool 321 (an angle between it and the forming surface 210) is adjusted to meet the requirements in different use scenarios. It is understandable that, an edge 3211 of the shoveling tool 321 may mainly contact with the forming surface 210 to have a better object shoveling effect. When the forming surface 210 of the forming platform 200 faces down, a state of the shoveling tool 321 may be adjusted by the tool holders 322 rotatably connected to the transmission blocks 339, so that one side of the edge 3211 of the shoveling tool 321 is upward, that is, one side of the edge 3211 is higher relative to other parts of the shoveling tool 321, or it at least remains horizontal, which enables a better contact between the edge 3211 and the forming surface 210.

Figure 7:
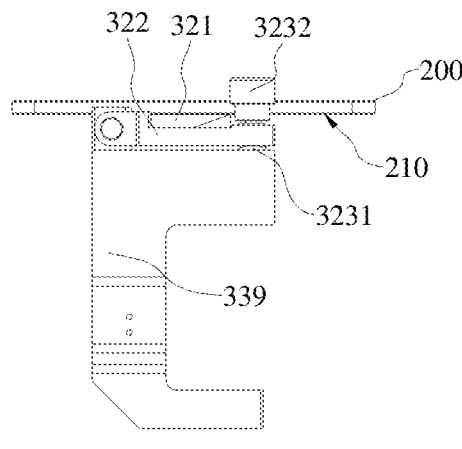
FIG. 7 shows a side face of a shoveling tool towarding a forming surface being parallel to the forming surface according to an embodiment of the disclosure.

As shown in FIG. 5, in optional implementations, the shoveling tool assembly 320 may further include an adjusting assembly 323. One end of the tool holder 322 may be rotatably connected to the transmission block 339, the other end of the tool holder 322 may be matched with the adjusting assembly 323, the shoveling tool 321 is fixedly connected to the tool holder 322, and the adjusting assembly 323 is configured to adjust a rotation angle of the tool holder 322 relative to the transmission block 339, so as to adjust an inclination angle of the shoveling tool 321 relative to the forming surface 210. As shown in FIG. 6, a certain angle is provided between a side surface of the shoveling tool 321 toward the forming surface 210 and the forming surface 210 through the adjusting assembly 323, or as shown in FIG. 7, the side surface of the shoveling tool 321 toward the forming surface 210 is adjusted to be parallel to the forming surface 210.

In the embodiment, the adjusting assembly 323 includes a first elastic element 3231. One end of the first elastic element 3231 may abut against the tool holder 322 while the other end thereof may abut against the transmission block 339. The first elastic element 3231 applies a force toward the forming surface 210 to the tool holder 322, thereby having a tendency to enlarge the inclination angle of the shoveling tool 321 relative to the forming surface 210. In FIG. 6, the first elastic element 3231 has a tendency to push the tool holder 322 to rotate counterclockwise, so that when the edge 3211 of the shovel blade 321 is in contact with the forming surface 210, the first elastic element 3231 presses the shoveling tool 321 against the forming surface 210, and maintains a certain pressure, which ensures the effect of object shoveling. On the other hand, the first elastic element 3231 is deformable, so that the shoveling tool 321 can be moved within a certain range during the object shoveling, thereby reducing the risk of damage to the shoveling tool 321 caused by excessive stress when the forming platform 200 presses the shoveling tool 321. In the embodiment, the first elastic element 3231 may be a compression spring.

It is understandable that, in order to ensure a good object shoveling effect, the inclination angle between the shoveling tool 321 and the forming surface 210 should not be too large, otherwise easily causing excessive force between the shoveling tool 321 and the printed object when the shoveling tool is sliding on the forming surface 210, and the damage to the printed object or the edge 3211 of the shoveling tool 321. In addition, a large inclination angle between the shoveling tool 321 and the forming surface 210 may also cause the damage to the edge 3211 of the shoveling tool 321 under high stress (such as edge turning) when the shoveling tool 321 and the forming surface 210 approach each other and are pressed. Therefore, in some cases, it is necessary for the shoveling tool 321 to set a reasonable pre-assembly angle, rather than allowing a large elevation angle of the first elastic element 3231 pushed by the shoveling tool 321. Therefore, optionally, the adjusting assembly 323 may further include an adjusting element 3232. A distance from the adjusting element 3232 to the transmission block 339 is adjustable, and the adjusting element 3232 is configured to abut against the side, away from the first elastic element 3231, of the tool holder 322, so as to limit the rotation range of the tool holder 322 to limit the elevation angle of the shoveling tool 321, i.e., to limit the maximum inclination angle of the shoveling tool 321 relative to the forming surface 210.

Specifically, the adjusting element 3232 in the embodiment may be an adjusting bolt, a threaded portion of the adjusting bolt may partially pass through the tool holder 322 and the compression spring and be screwed to the transmission block 339, and a head of the adjusting bolt is configured to abut against the tool holder 322. It may be seen that, in a case where the first elastic element 3231 being compressed has sufficient elastic force, the adjusting bolt abuts against the tool holder 322, so as to limit the maximum elevation angle of the shoveling tool 321, i.e., to limit the pre-assembly angle of the shoveling tool 321. By screwing the adjusting bolt, the pre-assembly angle of the shoveling tool 321 can be adjusted. When the forming surface 210 is in contact with the shoveling tool 321, the first elastic element 3231 may be further compressed, so that the inclination angle between the shoveling tool 321 and the forming surface 210 may be reduced to an angle conducive to object shoveling through the rotation of the tool holder 322.

Figure 8:
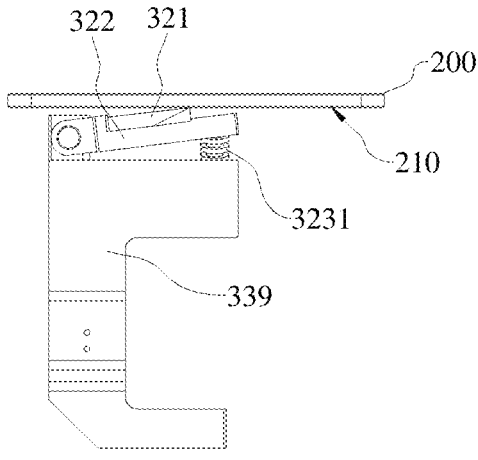
FIG. 8 shows contact between a shoveling tool and a forming platform when an adjusting assembly contains only a first elastic element according to an embodiment of the disclosure.

In some optional embodiments, the adjusting assembly 323 may contain only the first elastic element 3231. In this case, the tool holder 322 is not limited by the adjusting element 3232. In a case where the rotation of the tool holder 322 is not limited, the maximum extension amount of the first elastic element 3231 shall be limited to a reasonable range to avoid excessive rotating of the tool holder 322 with the shoveling tool 321 when the shoveling tool is not pressed against the forming platform 200. In an embodiment, refer-ring to FIG. 8, the adjusting assembly 323 may contain only the first elastic element 3231, and the tool holder 322 is provided with a limiting feature relative to the transmission block 339, so that the tool holder 322 abuts against the transmission block 339 and cannot continue to rotate when rotating counterclockwise to a certain angle, thereby limit-ing the maximum rotation angle of the tool holder 322 relative to the transmission block 339, limiting the maxi-mum elevation angle of the shoveling tool 321, and avoiding bringing inconvenience to assembly due to the excessive turning angles of the shoveling tool 321 and the tool holder 322 in the assembly stage. In an application scenario, the limiting feature enables the tool holder 322 to rotate coun-terclockwise by a maximum of 7°.

In other optional embodiments, the first elastic element 3231 is not limited to the compression spring, but may also be an elastic part such as rubber part and a torsion spring.

Referring to FIG. 5, the shoveling tool 321 may be strip-shaped, and include two ends arranged in the length direction thereof, and the edge 3211 of the shoveling tool 321 may extend in the length direction of the shoveling tool 321 and be arranged between the ends of the shoveling tool 321. In an embodiment, the shoveling tool assembly 320 may further include blocking elements 324. The blocking elements 324 may be specifically arranged on the shoveling tool 321 and configured to block the flow of liquid on the shoveling tool 321 towards the two ends of the shoveling tool 321 during the object shoveling process of the shoveling tool 321. As shown in FIG. 5, the number of blocking elements 324 may be two, and the part of the shoveling tool 321 between the two blocking elements 324 is configured for object shoveling. Part of the uncured print material may remain on the surface of the printed object when the printed object is just printed, the liquid print material is blocked by the blocking elements 324 and prevented from flowing to both ends of the shoveling tool 321 along the shoveling tool 321, or dripping outside a carrying element 351 below the shoveling tool 321 to cause contamination to the device.

Figure 9:
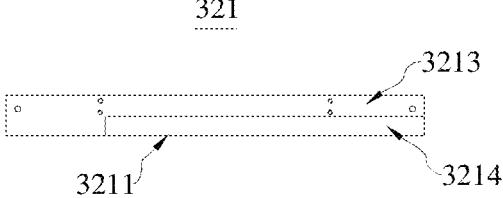
FIG. 9 is a schematic diagram of a shoveling tool according to an embodiment of the disclosure.
Figure 10A:
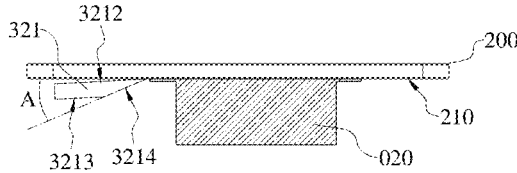
FIG. 10*a* to FIG. 10*c* are schematic diagrams of a shoveling tool during an object shoveling process according to an embodiment of the disclosure.
Figure 10B:
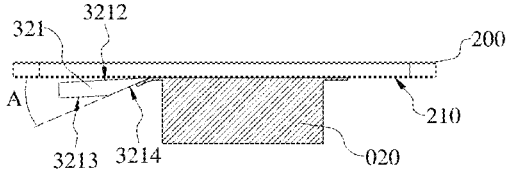
Figure 10C:
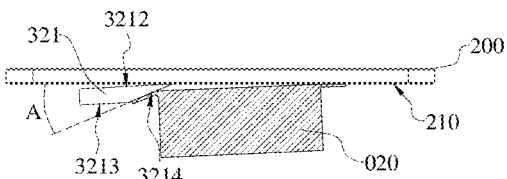

FIG. 9 is a schematic diagram of a shoveling tool 321 according to an embodiment of the disclosure, and FIG. 10a to FIG. 10c are schematic diagrams of a shoveling tool 321 during an object shoveling process according to an embodi-ment of the disclosure. As shown in FIG. 9 and FIGS. 10a to 10c, in the embodiment, the shoveling tool 321 is pro-vided with a first surface 3212 and a second surface 3213 which are opposite to each other, and a slope surface 3214 connecting the first surface 3212 to the second surface 3213. An angle between slope surface 3214 and the first surface 3212 is an acute angle, the edge 3211 of the shoveling tool 321 is formed at an intersection of the slope surface 3214 and the first surface 3212, and an angle between the slope surface 3214 and the first surface 3212 is an edge angle. When the shoveling tool 321 slides on the forming surface 210, the edge 3211 is in contact with the forming surface 210, the first surface 3212 faces the forming surface 210, and the second surface 3213 is away from the forming surface 210. The slope surface 3214 is inclined downward, and as the shoveling tool 321 cuts in from an edge of the printed object 020, a surface, previously in contact with the forming surface 210, of the printed object 020 slides onto the slope surface 3214, and the slope surface 3214 of the shoveling tool 321 may guide the printed object 020 to smoothly stripped it from the forming surface 210. The slope surface 3214 may have a lateral length same as the length of the shoveling tool 321, or may only be arranged in one section of the shoveling tool 321 (meaning that the length of the edge 3211 is less than that of the shoveling tool 321), for example, may only be arranged in an area between the two blocking elements 324, or may also be arranged in a manner as shown in FIG. 9 according to actual needs, which is not limited herein. During the object shoveling, the edge 3211 of the shoveling tool 321 is in contact with the forming surface 210, and an inclination angle between the slope surface 3214 and the forming surface 210 is the feed angle (angle A in FIG. 10a to FIG. 10c). The feed angle needs to be limited within a reasonable range. A small feed angle makes object shoveling smoother, and the printed object 020 is less likely to be damaged. However, if the feed angle is too small, the blade angle of the shoveling tool 321 is also relatively small, and the smaller blade angle is prone to cause cracking or edge turning of the edge 3211. In some optional embodi-ments, the feed angle may be set at 15° to 20° during the object shoveling, so that the edge angle of the shoveling tool 321 should be less than or equal to the feed angle.

In the embodiment, the section of the shoveling tool 321 may be a right trapezoid. The section refers to a section which is perpendicular to the length direction of the shov-eling tool 321 and located at the edge 3211. The inclined waist of the right trapezoid of the section corresponds to the slope surface 3214 of the shoveling tool 321, the bottom edge of the right trapezoid corresponds to the first surface 3212 of the shoveling tool 321, and the top edge of the right trapezoid corresponds to the second surface 3213 of the shoveling tool 321.

Figure 11:
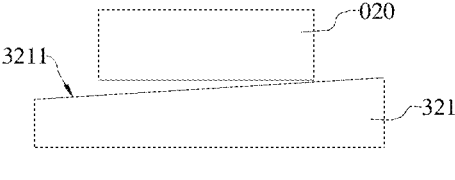
FIG. 11 is a schematic diagram of a shoveling tool with an inclined edge during an object shoveling process according to an embodiment of the disclosure.

A prolonged service life of the shoveling tool 321 reduce a frequency of replacing the shoveling tool 321, so that the production efficiency is improved. Because the acting force between the shoveling tool 321 and the printed object 020 affects the wear rate of the edge 3211 of the shoveling tool 321 during the object shoveling process, and then affects the service life of the shoveling tool 321, it is necessary to reasonably reduce the acting force between the shoveling tool 321 and the printed object 020 during the object shoveling process, so that the object shoveling process is smoother. In the embodiment, as shown in FIG. 9, the edge 3211 of the shoveling tool 321 may be a linear edge 3211, which is in line contact with the forming surface 210. If an edge of a contact surface of the printed object 020 to be stripped from the forming surface 210 is straight, and is perpendicular to a driving direction of the object shoveling driving assembly 330 (i.e., the direction of movement of the shoveling tool 321), the edge 3211 of the shoveling tool 321 and the edge of the printed object 020 may be in line contact when contacting with each other. At this time, the acting force between the shoveling tool 321 and the printed object 020 is large, and the edge 3211 of the shoveling tool 321 is embedded between the printed object 020 and the forming surface 210 under high resistance. In order to reduce the resistance when the shoveling tool 321 starts to insert between the printed object 020 and the forming surface 210, an initial contact manner between the edge 3211 of the shoveling tool 321 and the printed object 020 may be a point contact. FIG. 11 is a schematic diagram of object shoveling through a shoveling tool 321 with an inclined edge 3211 according to an embodiment of the disclosure. FIG. 11 is a top view from a side where a forming platform 200 is located. As shown in FIG. 11, in order to reduce the resistance of the initial contact between the shoveling tool 321 and the printed object 020, in an optional embodiment, the linear edge 3211 of the shoveling tool 321 may be inclined to the driving direction of the object shoveling driving assembly 330. In this case, the edge 3211 of the shoveling tool 321 remains in line contact with the forming surface 210. However, if the edge of the printed object 020 is linear and perpendicular to the direction of movement of the shoveling tool 321, the shoveling tool 321 may start to cut from one end of the linear edge of the printed object 020. In this object shoveling manner, the initial contact manner between the edge 3211 and the printed object 020 is the point contact, and the interaction force between the printed object 020 and the shoveling tool 321 is small. Moreover, in the subsequent object shoveling process, the movement of the shoveling tool 321 relative to the printed object 020 has a component in an extension direction of the edge 3211 printed object, which achieves the effect of transverse cutting, and is also conducive to reducing the acting force between the printed object and the shoveling tool 321.

Figure 12:
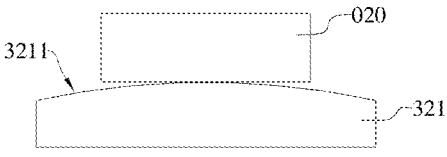
FIG. 12 is a schematic diagram of a shoveling tool with a curved edge during an object shoveling process according to an embodiment of the disclosure.

FIG. 12 is a schematic diagram of object shoveling through a shoveling tool 321 with a curved edge 3211 according to an embodiment of the disclosure. FIG. 12 is a top view from a side where a forming platform 200 is located. As shown in FIG. 12, in order to make the initial contact manner between the edge 3211 and the printed object 020 be point contact, the edge 3211 of the shoveling tool 321 may be a curved edge 3211. When the shoveling tool 321 with the curved edge 3211 performs object shoveling, a foremost portion of the edge 3211 is in contact with the edge of the printed object 020 first and gradually cuts in from one point, which reduces the contact force between the shoveling tool 321 and the printed object 020 at the initial stage of object shoveling, so that the printed object 020 is more easily shoveled.

Of course, in order to make the shoveling tool 321 better strip the printed object 020, the shape of a part of the printed object 020 adhering the forming surface 210 may also be optimized. For example, the contour of the edge where the printed object 020 is in contact with the forming surface 210 is circular, or has an arc portion for allowing the shoveling tool 321 to cut into, so that the shoveling tool 321 is in point contact with the edge of the printed object 020 at beginning of the object shoveling. Or, a digital model of the printed object 020 may be designed, so that a contact angle between the printed object 020 and the forming surface 210 is an obtuse angle at the early stage of forming the printed object 020, that is, an acute angle is defined by the forming surface 210 and an outer surface of the printed object 020 which is connected to a bottom surface (i.e., a surface in direct contact with the forming surface 210) and proximate to the object shoveling tool. In this way, the printed object 020, at its edge, is provided with a wedge-shaped chamfer for allowing the shoveling tool 321 to cut into, so that the printed object 020 is subjected to the lever force prying it away from the forming platform 200 at the moment when the shoveling tool 321 cuts into the printed object 020. A conventional cutting method must cut into a certain size, and an acting force may be applied to the printed object 020 through the shoveling tool 321 to form a gap.

In the embodiment, the shoveling tool 321 is the shovel blade with the edge. However, in other optional embodiments, the shoveling tool 321 may also be a steel wire, a diamond wire, or other wires that meet the requirements for tensile strength, and also play a role in stripping the printed object. In some embodiments, a heatable metal wire used as the shoveling tool 321 also achieves thermal cutting, which is conducive to stripping the printed object. For example, the metal wire may be heated by energizing.

In the embodiment, the shoveling tool assembly 320 may further include a shoveling tool tag 325. The shoveling tool tag 325 may be arranged on the shoveling tool 321 to move along with the shoveling tool 321, and may be specifically arranged proximate to the shoveling tool 321 in the length direction, and a portion of the shoveling tool 321 where the shoveling tool tag is located is not configured for object shoveling, and is not contaminated by the print material under the blocking of the blocking element 324. Accordingly, the printer 010 is further provided with a shoveling tool reader 340, configured to identify the shoveling tool tag 325. The shoveling tool reader 340 may be fixedly arranged at a position close to an initial position of the shoveling tool 321, and may be directly or indirectly mounted on the substrate 500 through a support, so that when the shoveling tool 321 completes object shoveling and returns to the initial position of the shoveling tool, the shoveling tool reader 340 determines the frequency of use of the shoveling tool 321 after identifying the shoveling tool tag 325, thereby playing a role in guiding the replacement of the shoveling tool 321.

Further, the shoveling tool tag 325 may be a Near Field Communication (NFC) tag, and the NFC tag records the frequency of use of the corresponding shoveling tool 321 by writing. Specifically, when the shoveling tool 321 completes object shoveling and returns to the initial position of the shoveling tool, the shoveling tool reader 340 may be controlled by a control mechanism of the 3D printer 010 to communicate with the shoveling tool tag 325, so that the shoveling tool tag 325 performs an operation of writing the frequency of use. The shoveling tool reader 340 is an NFC reader accordingly, and able to communicate with the NFC tag when the shoveling tool 321 returns to the initial position of the shoveling tool, reads the frequency of use of the shoveling tool 321 from the NFC tag, and feeds it back to the control mechanism. When the control mechanism receives that the number of use of the shoveling tool 321 has reached a threshold, its service life, or is about to reach its service life, an alarm or early warning may be given by controlling a control screen or in other manner such as ringing, flashing, etc., to remind that the corresponding shoveling tool 321 is required to be replaced in time. In addition, because the NFC tag may record the number of use of the shoveling tool 321 by itself, when a shoveling tool 321 is used on different printers 010, the shoveling tool reader 340 also obtains the number of use of the shoveling tool 321 from the shoveling tool tag 325, so as to know the remaining service life of the shoveling tool 321.

Of course, in other embodiments, the positions and communication timing of the shoveling tool tag 325 and the shoveling tool reader 340 are not limited to the above manners. For example, the shoveling tool 321 may also be mounted to control NFC between the shoveling tool tag 325 and the shoveling tool reader 340, so as to achieve reading and writing, which may be specifically set according to actual needs, and is not limited herein.

Figure 13:
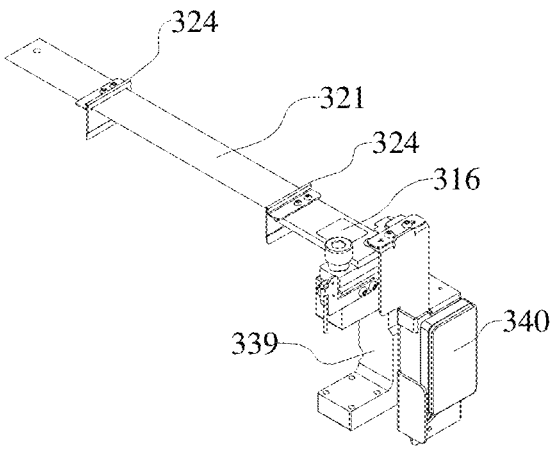
FIG. 13 is a schematic diagram of arrangement of a reader according to an embodiment of the disclosure.

FIG. 13 is a schematic diagram of arrangement of a shoveling tool reader 340 according to an embodiment of the disclosure. As shown in FIG. 13, the shoveling tool reader 340 may be arranged on an outer surface of the transmission block 339, so as to move along with the shoveling tool 321. Specifically, the shoveling tool reader 340 may be arranged on a support mounted on the outer side of the transmission block 339. In other optional embodiments, the shoveling tool reader 340 may also be arranged in other positions of the printer 010, as long as able to achieve NFC with the NFC tag. In some other embodiments, the shoveling tool tag 325 may also be at least one of other types of electronic tags, such as a two-dimensional code, a character code, a numeric code, a bar code, a special pattern, an NFC tag, a Radio Frequency Identification (RFID) tag, an electronic chip, etc. In addition, the tag itself may not have a recording function, but after the reader identifies the tag, a controller connected to the reader records the use of the shoveling tool 321. Of course, the NFC tag is not limited to only record the frequency of use of the corresponding shoveling tool 321, but also record other identity information of the corresponding shoveling tool 321 as required, such as serial number, shape, material, factory time, manufacturer, material for shoveling the printed object, tolerable scope of object shoveling force, etc., which may be specifically selected according to actual use needs, and is not specifically limited herein.

Figure 14:
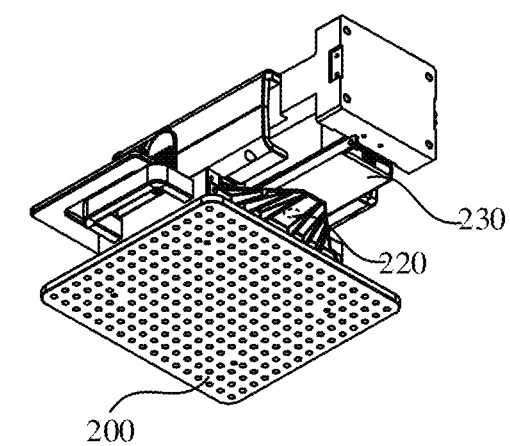
FIG. 14 is a schematic diagram of a forming platform and related structures according to an embodiment of the disclosure.

In an embodiment, referring to FIG. 14, the forming platform 200 of the 3D printer may also be provided with a platform tag 220 having the similar function to the shoveling tool tag 325, and a corresponding platform reader 230 is mounted at a position corresponding to the platform tag 220, such as on a mounting structure of the forming platform 200, so as to cooperatively write and read the frequency of use of the forming platform 200, thereby monitoring the service life of the forming platform 200. In an application scenario, when the forming platform 200 is mounted and about to work for printing, the control mechanism may control the communication between the platform reader 230 and the platform tag 220 on the forming platform 200, and read the recorded number of use. If the service life of the forming platform has reached, or it is predicted that the recorded number of use and the number of reuse for printing the next printed object may exceed its service life, printing with the forming platform 200 is not permitted, for example, by displaying a reminder sign on the control screen. For example, if the platform reader 230 reads that the forming platform 200 has been used 29,999 times, and the service life of the forming platform 200 is 30,000 times, the next printed object to be printed has 1000 layers, and it is predicted that the printing platform 200 is used more than 30,000 times after printing this printed object, so that a reminder is issued and printing with the forming platform 200 is not permitted.

In another application scenario, if the forming platform 200 is not provided with the platform tag 220, when the control mechanism controls the platform reader 230 to communicate with the platform tag 220 on the forming platform 200, communication cannot be achieved, and printing with the forming platform 200 is not permitted.

For a recording function of the NFC tag, the control mechanism controls the communication between the platform reader 230 and the platform tag 220, so that the platform tag 220 writes the corresponding number of use, and the platform tag 220 records its own service life. The number of use may be written to the platform tag 220 on the forming platform 200 once after one layer is printed, or the corresponding number of use of the printed object may be written after completing or starting one-time printing, which may be specifically set according to actual needs, and is not specifically limited herein. In this way, the number of use is recorded in the platform tag 220 attached to the forming platform, if the forming platform 200 is transferred from one printer to another, a platform reader 230 on another printer will perform reading and writing operations to the platform reader 230 in the manner described above.

Figure 15:
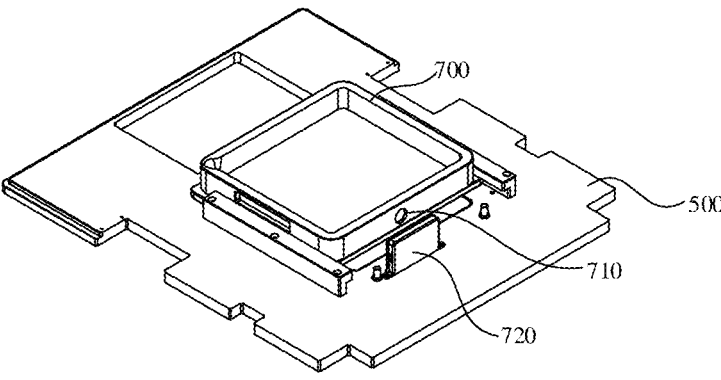
FIG. 15 is a schematic diagram of a tray and related structures according to an embodiment of the disclosure.

Further, referring to FIG. 15, in another embodiment, the tray 700 may be provided with a tray tag 710 having the similar function to the platform tag 220, and a corresponding tray reader 720 is mounted at a position corresponding to the tray tag 710, such as on a mounting structure of the tray 700, so as to cooperatively write and read the number of use of the tray 700, thereby monitoring the service life of the tray 700. Specifically, when the tray 700 is mounted on the printer, the control mechanism controls the communication between the tray tag 710 and the tray reader 720, so as to achieve writing and reading. The functions and implementations of the tray tag 710 and the tray reader 720 herein may be the same as those of the platform tag 220 and platform reader 230 described above. Referring to the above embodiments for details, which will not be elaborated here.

Figure 16:
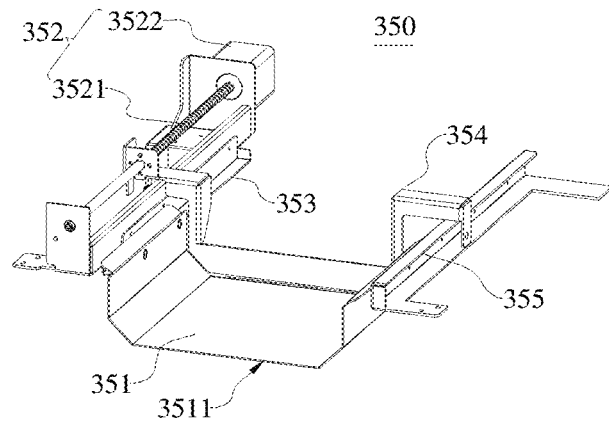
FIG. 16 is a first schematic diagram of an object receiving assembly according to an embodiment of the disclosure.
Figure 17:
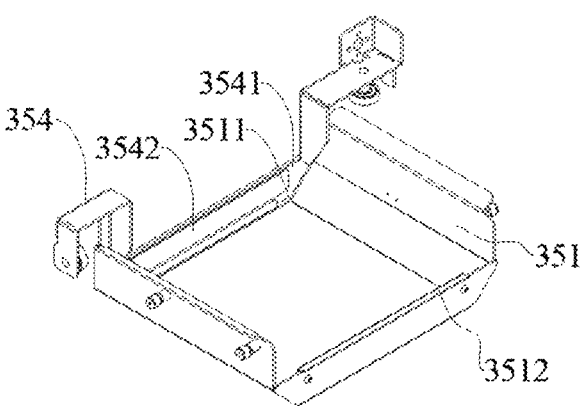
FIG. 17 is a second schematic diagram of an object receiving assembly according to an embodiment of the disclosure.

FIG. 16 is a schematic diagram of an object receiving assembly 350 according to an embodiment of the disclosure. As shown in FIG. 16 to FIG. 17, in the embodiment of the disclosure, the object receiving assembly 350 may include a carrying element 351 and an object receiving driving assembly 352, the carrying element 351 is provided with an object receiving position and an unloading position. The carrying element 351 is movable, and may be located between the forming platform 200 and the tray 700 when at the object receiving position, so as to receive the printed object 020 falling from the forming surface 210, and may unload the accommodated printed object 020 when at the unloading position. The object receiving driving assembly 352 is configured to drive the carrying element 351 to move between the object receiving position and the unloading position, so as to cooperate with the object shoveling assembly 310 to automatically shovel and transfer the printed object 020 that has been printed and is adhered to the forming platform 200, thereby achieving the unattended automatic object shoveling and object receiving operations of the printer 010. Further, through the arrangement of the object receiving assembly 350, on the one hand, object shoveling may be performed directly in an original position of the forming platform 200, without the need for the movement of mechanisms and parts of the 3D printer for performing printing operations, such as the forming platform 200, and removing the forming platform 200, that is, for example, only the shoveling tool 321 and the carrying element 351 need to move under the forming platform 200 object shoveling for object shoveling and object receiving. Compared with the related technology in which the forming platform 200 needs to be moved to a set position or the forming platform 200 needs to be removed from the printer for object shoveling, the solution in the embodiment greatly improves the stability of the 3D printer, thereby improving the printing quality of the printer, and reducing the maintenance frequency and the maintenance cost of the printer. On the other hand, due to the bearing function of the carrying element 351, the liquid print material adhered to the forming platform 200, the printed object 020 and the shoveling tool 321 may directly flow into an object receiving space of the carrying element 351, so as to avoid dripping to other positions and causing pollution.

In the embodiment, the object receiving position and the unloading position may be spaced in a second direction, so that a moving path of the carrying element 351 may be parallel to a moving path of the shoveling tool 321. Specifically, the object receiving assembly 350 may further include carrying element tracks 353. The carrying element 351 are arranged to the carrying element tracks 353 on both sides, and may be driven by the object receiving driving assembly 352 to slide along the carrying element track 353 in the second direction, and the carrying element track 353 may play a role in supporting the carrying element 351 and guiding the carrying element 351. Specifically, the object receiving assembly 350 may further include wheels connected to the carrying element 351 and mounted on both sides of the carrying element 351. The carrying element 351 may be arranged to the carrying element tracks 353 through the wheels, and the carrying element 351 slides on the carrying element track 353 through the rolling of the wheels and/or sliding. Further, the number of the wheels may be four, that is, two wheels are mounted on both sides of the carrying element 351, so as to achieve the stable sliding of the carrying element 351. Both sides of the carrying element 351 here may refer to both sides of the carrying element 351 in the length direction of the shoveling tool 321.

In the embodiment, the carrying element 351 is provided with the object receiving space configured to accommodate the printed object 020, so that it may be basket-shaped, and the carrying element 351 is provided with a unloading opening 3511 communicating with the object receiving space on a side, and the unloading opening 3511 allows removing the printed object 020 from the carrying element 351. Of course, in other optional embodiments of the disclosure, the carrying element 351 may have different structural forms, such as a plate, as long as able to play a role in receiving the printed object.

Further, the object receiving assembly 350 may include an object moving element 354. The object moving element 354 may be configured to stir the printed object in the carrying element 351 out to empty the object receiving space, so that the carrying element 351 may continue to receive other printed objects. The object moving element 354 may include an object moving element 3541. The object moving element 3541 is configured to stir the printed object in the carrying element space in the stirring stage, so as to stir the printed object out of the unloading opening 3511. Further, because after one-time printing is completed, the liquid print material may remain on the forming platform 200 or the printed object, these liquid print materials may flow into the object receiving space of the carrying element 351 during the object shoveling. Therefore, in an application scenario, the object moving element 3541 may be located at least on the side, close to the bottom of the object receiving space of the carrying element 351, of the overall structure of the object moving element 354, so that the liquid print material in the object receiving space is also stirred out of the unloading opening 3511 during object stirring.

In one application scenario, the object moving element 3541 may be made of a rigid material, and it is understandable that, especially in a case where the material of the bottom of the object receiving space of the carrying element 351 is also the rigid material, there may be a certain gap between the object moving element 3541 and the bottom of the object receiving space during material stirring, so that even after the material stirring is completed, a certain amount of liquid print materials may still remain in the object receiving space of the carrying element 351.

In another application scenario, the object moving element 3541 may be at least partially made of a soft material, specifically at least a bottom area, close to the object receiving space of the carrying element 351, of the object moving element 3541 is made of the soft material, for example, the object moving element 3541 may be a soft object moving element, so that the object moving element 354 elastically abuts against the bottom of the object receiving space of the carrying element 351 during material stirring, so as to achieve the tight contact. In this way, the printed object accommodated in the object receiving space and possible liquid print material attached to the printed object are stirred out of the carrying element 351 during the material stirring process, thereby maintaining the cleanness of the object receiving space of the carrying element 351. The soft material may be silica gel, rubber and other materials with a certain elastic force.

Further, the object moving element 354 may further include a first magnetic part 3542. The first magnetic part 3542 may be arranged on the side, away from the unloading opening 3511, of the object moving element 3541. The carrying element 351 may further include a second magnetic part 3512. The second magnetic part 3512 may be located on the end, away from the unloading opening 3511, of the whole carrying element 351, and arranged towards the unloading opening 3511. In the embodiment, the object moving element 354 may be magnetically connected to the carrying element 351 through the first magnetic part 3542 and the second magnetic part 3512. Optionally, the first magnetic part 3542 is a magnet, and the material of the second magnetic part 3512 is a material capable of being attracted by the magnet. Or, the second magnetic part 3512 is the magnet, and the material of the first magnetic part 3542 is the material capable of being attracted by the magnet. Or, the first magnetic part 3542 and the second magnetic part 3512 are the magnets, and are opposite in polarities on opposite sides to be attracted. Optionally, when the first magnetic part 3542 and/or the second magnetic part 3512 are the magnets, they may be ordinary magnets or electromagnets to be controlled to produce or eliminate magnetism or have permanent magnetism. The part, capable of being magnetically connected to the object moving element 354, of the carrying element 351 is at least located on the side, away from the unloading opening 3511, of the carrying element 351 in the second direction.

The object receiving driving assembly 352 may be in transmission connection with the object moving element 354 to drive the object moving element 354 to move, and further drive the carrying element 351 to move in at least some application scenarios. Specifically, the object receiving driving assembly 352 may include a lead screw 3521 and an object receiving driving element 3522. The lead screw 3521 may be screwed to the object moving element 354, and the object receiving driving element 3522 is configured to drive the lead screw 3521 to rotate, so as to drive the carrying element 351 to move. The object receiving driving element 3522 may be selected as a stepper motor.

Further, the object receiving assembly 350 may further include object moving element tracks 355. An extension direction of the object moving element tracks 355 may be consistent with that of the carrying element track 353, specifically the second direction, so as to guide the object moving element 354 to slide in the second direction. In the embodiment, the number of the object moving element tracks 355 is two, the number of the lead screw 3521 is one, both ends of the object moving element 354 in the first direction may be respectively arranged on the corresponding object moving element tracks 355, and the object receiving driving assembly 352 is connected to one end of the object moving element 354, so as to drive the object moving element 354 to slide along the two object moving element tracks 355. Wheels (such as bearings) may be mounted on both ends of the object moving element 354, so as to achieve the movement of the object moving element 354 on the object moving element tracks 355 through the rotating of the wheels, one end of the object moving element 354 may be in threaded fit connection with the lead screw 3521, and specifically, the object moving element 354 is connected to the lead screw 3521 through a trapezoidal nut. In other embodiments, the number of the object moving element track 355 may also be one, one end of the object moving element 354 is connected to the lead screw 3521 while the other end thereof may be arranged on the object moving element track 355. In addition, the number of the lead screws 3521 may also be two, and both ends of the object moving element 354 may be respectively connected to the two lead screws 3521 one by one, which may be specifically selected according to actual needs, and is not specifically limited herein.

Further, the object receiving assembly 350 may further include a limiting element. The limiting element is configured to abut against the carrying element 351 when the carrying element 351 moves to the unloading position to limit the continued movement thereof. The limiting element may be arranged on the carrying element track 353. Specifically, the limiting element may be a barrier sheet, and is configured to limit the wheels connected to the carrying element 351. The carrying element 351 is limited by limiting the movement of the wheels.

It is to be noted that, after the carrying element 351 reaches the unloading position, the object receiving driving assembly 352 may continue to drive the object moving element 354 to move away from the object receiving position, so that the object moving element 354 overcomes the magnetic attraction with the carrying element 351 and moves away from a magnetic connection area with the carrying element 351, and the object moving element 354 stirs the printed object 020 in the carrying element 351 out of the carrying element 351. In the embodiment, the shape of a middle part of the object moving element 354 is matched with that of the carrying element 351, and the middle part may extend into the object receiving space for accommodating the printed object 020 of the carrying element 351. It is to be noted that, when the carrying element 351 initially reaches the unloading position, the object moving element 354 may be located on the side, away from the unloading opening 3511, of the object receiving space of the carrying element 351. After the carrying element 351 reaches the unloading position and stops moving, the object moving element 354 is driven by the object receiving driving assembly 352 to further move towards the unloading opening 3511 in the second direction, so that the printed object 020 accommodated by the carrying element 351 is stirred out of the carrying element 351 from the unloading opening 3511.

In an embodiment, the printer 010 may further include a storager 400. The storager 400 may be arranged below the unloading opening 3511 of the carrying element 351, and configured to receive the printed object 020 stirred out by the storager 400 from the unloading opening 3511 of the carrying element 351. Specifically, the substrate 500 is further provided with a through object receiving hole 520 (shown in FIG. 2). The object receiving hole 520 may be specifically located at the end, away from the forming platform 200 and the tray 700, of the object shoveling mechanism 300, and corresponds to the unloading position, and the storager 400 may be placed corresponding to the object receiving hole 520, so that when the carrying element 351 moves to the unloading position for unloading, the printed object 020 may directly enter the storager 400 through the object receiving hole 520 after being stirred out of the unloading opening 3511.

In the embodiment, the object moving element 354 may be U-shaped, but in other optional embodiments of the disclosure, the object moving element 354 may also be in other shapes, such as a plate, as long as the printed object 020 is allowed to be stirred out of the carrying element 351.

It is understandable that, in the embodiment, the carrying element 351 and the object moving element 354 may move through the same drive mechanism, i.e., the object receiving driving assembly 352. In addition, in the optional embodiments, the object moving element 354 may be driven by an independent drive mechanism, which is only configured to unload the printed object carried by the carrying element 351 and not used for driving the carrying element 351 to move. The carrying element 351 may be directly connected to the object shoveling driving assembly 330 to achieve being driven. Of course, in other embodiments, the shoveling tool 321, the carrying element 351 and the object moving element 354 may also be independently driven by independent drive mechanisms, which may be specifically set according to actual needs, and is not limited herein.

Figure 18:
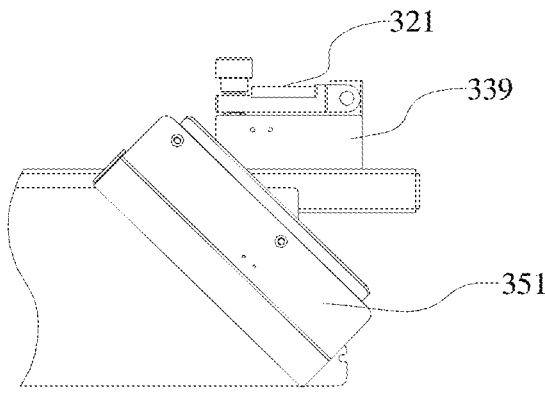
FIG. 18 is a schematic diagram of a rotated carrying element according to another embodiment of the disclosure.

In other optional embodiments, the function of sending out the printed object 020 from the carrying element 351 may be implemented without the object moving element 354. FIG. 18 shows a rotatable carrying element 351 carrying element according to another embodiment of the disclosure. As shown in FIG. 18, in some embodiments, the carrying element 351 may be arranged rotatable, and after the carrying element 351 reaches the unloading position, the internal printed object 020 thereof may be dumped out by rotating the carrying element 351. Optionally, the object receiving assembly 350 may further include a rotating assembly, which may be configured to drive the carrying element 351 to rotate at the unloading position, so that the printed object 020 accommodated in the object receiving space is dumped out of the unloading opening 3511. The form of the rotating assembly may be arranged as required, for example, the rotating assembly is in transmission with the carrying element 351, moves along with the carrying element 351, and drives the carrying element 351 to rotate when the carrying element 351 reaches the unloading position. Or, the rotating assembly is arranged at the unloading position, and does not move along with the carrying element 351, the carrying element 351 may rotate under an external force, and when the carrying element 351 reaches the unloading position, the rotating assembly acts on the carrying element 351 and applies a force to the carrying element 351 to make the unloading opening 3511 inclined downward.

The printer 010 provided by the embodiments of the disclosure further includes a control mechanism. The platform driving mechanism 800, the object shoveling driving assembly 330, the object receiving driving assembly 352 and a projector 610 are electrically connected to the control mechanism, and complete corresponding operations under the control of the control mechanism. In the embodiment, the control mechanism needs to perform the corresponding control operations according to obtained information such as a state of a specific structure and a movement position. FIG. 19 is a distribution diagram of each sensor of an object shoveling mechanism 300 according to an embodiment of the disclosure. As shown in FIG. 19, specifically, the object shoveling mechanism 300 is provided with a first sensor 360, a second sensor 361, an object receiving position sensor 362 and an object moving completion sensor 363, each of which may be electrically connected to the control mechanism.

The first sensor 360 and the second sensor 361 may be configured to detect two limit positions of the shoveling tool 321. In the embodiment, the shoveling tool 321 moves linearly, and both ends of the moving path thereof are a termination position of the shoveling tool 321 and an initial position the shoveling tool 321 respectively. The first sensor 360 is configured to output a termination sensing signal of the shoveling tool 321 to the control mechanism when the shoveling tool 321 reaches the termination position of the shoveling tool 321. The second sensor 361 is configured to output an initial sensing signal of the shoveling tool 321 to the control mechanism when the shoveling tool 321 reaches the initial position of the shoveling tool 321, and the termination sensing signal of the shoveling tool 321 and the initial sensing signal of the shoveling tool 321 facilitate the control mechanism to obtain position information of the shoveling tool 321, so as to control the start and stop of the movement. The termination position of the shoveling tool 321 is downstream of the initial position of the shoveling tool 321 in a direction the edge 3211 of the shoveling tool 321 is facing, that is, the termination position of the shoveling tool 321 is located in front of the shoveling tool 321 (a direction indicated by an arrow e in FIG. 3) during the object shoveling movement, and the initial position of the shoveling tool 321 is located behind the shoveling tool 321 during the object shoveling movement. The object shoveling movement is a forward movement of the edge 3211 of the shoveling tool 321 for stripping the printed object 020 from the forming platform 200.

It is to be noted here that, the object shoveling driving assembly 330 may drive the shoveling tool 321 to the initial position of the shoveling tool 321 to wait for the next object shoveling when object shoveling is not performed, or after one-time object shoveling is completed. The shoveling tool 321 at the initial position is located outside an area defined by the forming platform 200 and the tray 700, so that the printing operation of the printer 010 may not be affected. After the printer 010 completes one-time printing, the object shoveling driving assembly 330 drives the shoveling tool 321 to move close to the forming platform 200 in the second direction to a position between the forming platform 200 and the tray 700, moves from one end of the forming platform 200 to the other end, and stops driving until the shoveling tool 321 moves to the termination position of the shoveling tool 321. When the shoveling tool 321 is located at the termination position of the shoveling tool 321, it indicates that the shoveling tool 321 completes object shoving. At this time, the control mechanism may control the object shoveling driving assembly to pause driving the shoveling tool 321 to continue moving.

In the embodiment, the object moving element 354 is provided with an initial material stirring position and an object moving completion position. The object moving element 354, at the initial material stirring position, is magnetically connected to the carrying element 351 located at the object receiving position. The object moving element 354 moves to the object moving completion position after stirring the printed object in the carrying element 351 out of the carrying element 351 object moving completion. The object receiving position sensor 362 is configured to output an object receiving sensing signal to the control mechanism when the object moving element 354 reaches the initial material stirring position. It is understandable that, after one-time printing is completed, the object moving element 354 is driven by the object receiving driving assembly 352, the object moving element 354 drives the carrying element 351 to move in the second direction to a position between the forming platform 200 and the tray 700 through the magnetic attraction with the carrying element 351. When the object receiving position sensor 362 detects that the object moving element 354 is located at the initial material stirring position, the control mechanism controls the object receiving driving assembly 352 to pause driving the object moving element 354. It is to be noted that, when the object moving element 354 reaches the initial material stirring position, it indicates that the carrying element 351 is also located at the object receiving position at the same time, and may receive the printed object 020 stripped from the forming platform 200. At this time, the control mechanism may further control the object shoveling driving assembly 330 to drive the shoveling tool 321 to perform the object shoveling operation, so that the printed object 020 that is shoveled from the forming platform 200 falls into the carrying element 351. It is to be further noted here that, in order to ensure that the carrying element 351 is able to receive the printed objects 020 on the entire forming surface 210 of the forming platform 200, when the object moving element 354 moves to the initial material stirring position, that is, when the carrying element 351 is located at the object receiving position, a vertical projection of the space, configured to accommodate the printed object, of the carrying element 351 on the forming surface 210 may cover the entire forming surface 210 or areas of the forming surface 210 where the printed objects are adhered, so that the printed object 020 stripped from the forming platform 200 does not fall outside the object receiving space of the carrying element 351.

The object moving completion sensor 363 may be configured to output an object moving completion sensing signal to the control mechanism when the object moving element 354 reaches the object moving completion position. Generally, after the object shoveling of the shoveling tool 321 and object receiving of the carrying element 351 are completed, the object receiving driving assembly 352 drives the object moving element 354 with the carrying element 351 to move away from the forming platform 200 and the tray 700 in the second direction until the carrying element 351 moves to the unloading position, and the object moving element 354 does not reach the material receiving completion position at this time. As mentioned before, when the carrying element 351 moves to the unloading position, it stops moving due to the limitation of the limiting element, and the object moving element 354 overcomes the magnetic attraction with the carrying element 351 and continues to move. In the subsequent movement process, the object moving element 354 gradually stirs the printed object 020 accommodated in the carrying element 351 toward the unloading opening 3511 until moving to the object moving completion position. In this process, the printed object 020 stirred out of the unloading opening 3511 may fall into the storager 400.

In FIG. 19, the object moving element 354 is located at the object moving completion position, the carrying element 351 is located at the unloading position, and the shoveling tool 321 is located at the termination position of the shoveling tool 321.

In the embodiments of the disclosure, the first sensor 360, the second sensor 361, the object receiving position sensor 362 and the object moving completion sensor 363 may select the appropriate type of sensors to detect whether the corresponding parts are in place, for example, the sensors may be photoelectric sensors, such as correlation sensors or reflective sensors. Whether the corresponding part blocks the optical path is determined by determining whether an optical receiver receives an optical signal, so as to determine whether the corresponding part is in place. Accordingly, movable parts of the object receiving assembly 350 and the object shoveling assembly 310 (such as the carrying element 351, the transmission block 339 or the slide block 338) may be provided with detection pieces configured to block the optical path formed by the corresponding sensor when the movable part reaches the corresponding position. In other optional embodiments, the sensors may also be proximity switches or other mechanical sensors.

In the embodiments of the disclosure, the carrying element 351 is further provided with a waiting position spaced apart from the object receiving position. The carrying element 351 is located outside a printing area of the printer 010 when at the waiting position. The object shoveling mechanism 300 may further include a carrying element sensor 364. The carrying element sensor 364 is configured to output a waiting sensing signal when the carrying element 351 reaches the waiting position. The object receiving driving assembly 352 is configured to drive the carrying element 351 to move between the unloading position and the object receiving position. In an embodiment, the waiting position is arranged between the unloading position and the object receiving position. In another embodiment, the waiting position coincides with the unloading position. Of course, in other embodiments, the waiting position may also be located on the side, away from the object receiving position, of the unloading position. Through the arrangement of the waiting position, the carrying element 351 is able to wait for object receiving at the waiting position during the printing process of the printed object. After the printed object 020 is printed, the carrying element 351 moves from the waiting position to the object receiving position to receive the printed object 020 stripped from the forming platform 200.

In the embodiments of the disclosure, the storager 400 may have a relatively large capacity to store a plurality of printed objects 020 at one time. Further, a sensor may be arranged in the printer 010 to detect whether the storager 400 is full. In the embodiment, the storager 400 is provided with a full-piece sensor, which may be electrically connected to the control mechanism, and configured to output a full-piece sensing signal to the control mechanism when the storager 400 is full. Specifically, the full-piece sensor may be a photoelectric sensor, arranged at an opening of the storager 400, and the full-piece sensor forms an optical path at the opening of the storager 400. If the optical path is blocked for a long time, it is judged that the printed objects 020 in the storager 400 have been piled to a level of the opening of the storager 400, thereby determining that the storager 400 is full. In other optional embodiments, a gravity sensor may also be arranged to weigh the printed objects 020 in the storager 400, thereby determining whether the storager 400 is full by a detected weight value.

In an embodiment, the printer 010 may further include a pressure sensor, which may be arranged on the forming platform 200 and electrically connected to the control mechanism. Of course, the pressure sensor may also be arranged on the shoveling tool 321, which is not limited herein. Further, the pressure sensor may be configured to detect a pressure between the forming surface 210 of the forming platform 200 and the shoveling tool 321. A pressure value between the forming surface 210 and the shoveling tool 321 has a guiding significance for the object shoveling operation, which ensures the object shoveling effect while avoiding the damage to the device caused by the excessive pressure between the shoveling tool 321 and the forming platform 200.

Further referring to FIG. 2 and FIG. 19, in an embodiment, the printer 010 may further include a printed object sensor 365. The printed object sensor 365 may be arranged on the sliding seat 337 and spaced apart from the shoveling tool 321, and may be specifically mounted on the transmission block 339 and located on the side, proximate to the edge 3211, of the shoveling tool 321, so as to be located in front of the shoveling tool 321 when the shoveling tool 321 starts the object shoveling process and is in a moving path in which it moves from the initial position of the shoveling tool towards the termination position of the shoveling tool in the second direction, and be located behind the shoveling tool 321 when the shoveling tool 321 completes object shoveling and is in a moving path in which it moves from the termination position of the shoveling tool towards the initial position of the shoveling tool in the second direction.

The printed object sensor 365 may be a laser correlation sensor, and include a laser emitting part and a laser receiving part arranged oppositely. Specifically, the laser emitting part is mounted on a transmission block 339 at one end of the shoveling tool 321, and the laser receiving part is mounted on a transmission block 339 at the other end of the shoveling tool 321. Specifically, the printed object sensor 365 may detect whether the printed object exists on the forming surface 210 of the forming platform 200, or on the area of the forming surface 210 corresponding to the path passed by the printed object sensor 365, by the situation of the laser emitted by the laser emitting part and received by the laser receiving part.

Specifically, after one-time printing is completed, the printed object sensor 365 is driven by the object shoveling driving assembly 330 to move towards the forming platform 200 along with the sliding seat 337, and perform laser correlation detection when moving from the initial position of the shoveling tool 321 to the termination position of the shoveling tool 321. In this process, if the printed object is not detected at preset positions of the forming surface where the printed object needs to be detected, it is determined that the printed object falls off. At this time, the control mechanism may control the printer to pause the operation, and may further issue a fault prompt, so that the operator may check in time. It is easily understandable that, if the printed object falls off, the falling printed object may fall onto the tray 700. If the printing is continued after object shoveling without removing it in time object shoveling, when the forming platform 200 is pressed against the tray 700, the damage to the forming platform 200 and/or the tray 700 may be caused under the action of the printed object falling into the tray 700.

Further, when the object shoveling is completed and the shoveling tool 321 returns, the printed object sensor 365 is driven by the object shoveling driving assembly 330 to move towards the initial position of the shoveling tool, and laser correlation detection is performed when moving toward the initial position of the shoveling tool. In this process, if the printed object is detected on the forming surface 210, it is determined that the printed object is not completely shoveled. At this time, the control mechanism may also control the printer to stop operating, and may further issue the fault prompt.

In the embodiment, the object shoveling assembly 310 further includes a shield 326 (shown in FIG. 1). The shield 326 is arranged above the shoveling tool at the initial position (i.e. on the side, away from the substrate 500, of the initial position of the shoveling tool) to shield the shoveling tool 321 located at the initial position of the shoveling tool, thereby avoiding the operator from accidentally touching the shoveling tool 321 located at the initial position of the shoveling tool, and ensuring the personal safety of the operator.

In the embodiments of the disclosure, the 3D printer 010 may further include a human body sensing mechanism and an operating mechanism 110 (shown in FIG. 1) which are electrically connected to the control mechanism. The human body sensing mechanism is configured to output a human body sensing signal to the control mechanism when a human body is detected in a preset area. The control mechanism is configured to start or wake the operating mechanism 110 when receiving the human body sensing signal. The operating mechanism 110 includes at least one of a lighting mechanism, a display screen or a touch screen. When the operating mechanism 110 is the touch screen or the display screen, it may be automatically lightened after the person approaches and is detected, which is convenient for the user to operate. Of course, it is possible that the operating mechanism is dormant after the printing is completed for a period of time, such that the operating mechanism 110 is no long woken up when the person approaches, so as to avoid false sensing. Optionally, the human body sensing mechanism may include a 5.8 GHz microwave radar. Because Wireless Fidelity (WIFI), Bluetooth, Internet of Things (IOT), etc. occupy 2.4 GHZ, 2.4 GHz is easily interfered, and the adopted 5.8 GHz microwave radar is stable and low in cost.

Figure 20:
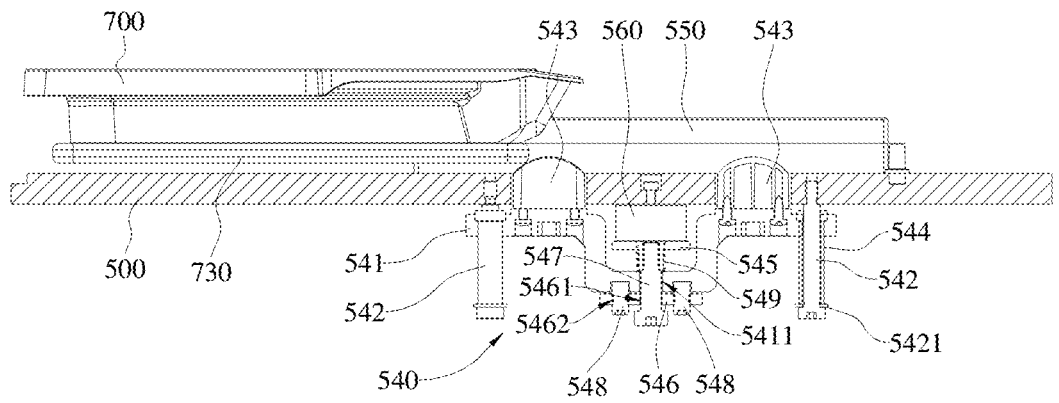
FIG. 20 shows a tray before being fixed according to an embodiment of the disclosure.
Figure 21:
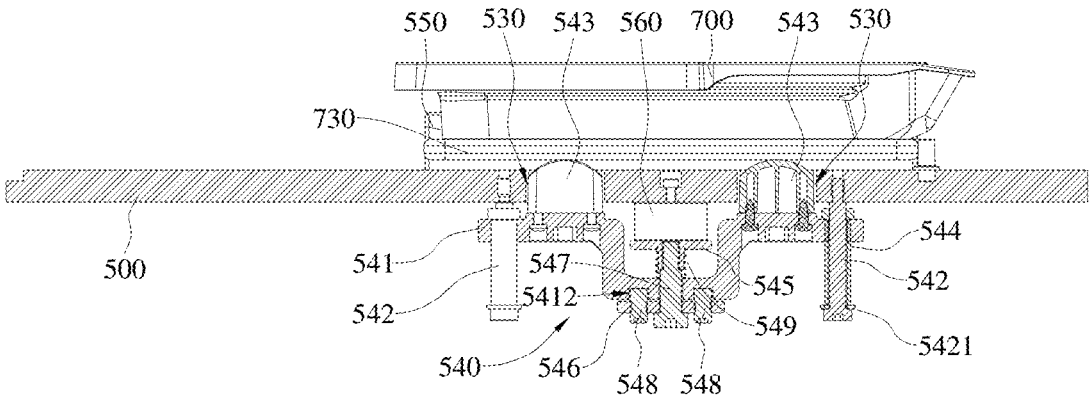
FIG. 21 shows a tray after being fixed according to an embodiment of the disclosure.

FIG. 20 shows a tray before being locking according to an embodiment of the disclosure, FIG. 21 shows a tray after being locking according to an embodiment of the disclosure, and FIG. 20 and FIG. 21 are partial sectional views. Referring to FIG. 20 and FIG. 21, in the embodiment, the substrate 500 is provided with an avoidance through hole 530, guide press blocks 550 are provided on an upper side of the substrate 500 such that a slot is formed between each guide press block 550 and a surface of the substrate 500, and an edge of the tray 700 is matched with the slot. Each guide press block 550 is configured to guide the movement of the tray 700 on the substrate 500 and cooperate with an abutting element 543 to clamp the tray 700. The tray 700 may be pushed into the slots in an extension direction of the slots formed by the guide press blocks 550, so that the position of the tray 700 in the vertical direction is limited. In the embodiment, the substrate 500 may be provided with the two guide press blocks 550, and the slots formed by the two guide press blocks 550 are parallel to each other.

In the embodiment, the tray 700 is provided with a flange 730. The flange 730 extends along a peripheral side of the bottom of the tray 700, and the tray 700 is in a slot fit with the guide press block 550 through the flange 730.

The 3D printer further includes a floating mechanism 540. The floating mechanism 540 includes a floating element 541, a guide shaft 542, an abutting element 543 and a second elastic element 544. The abutting element 543 may be raised or lowered at the avoidance through hole 530, and the second elastic element 544 is configured to push the abutting element 543 to abut against a lower surface of the tray 700, so that the tray 700 is clamped by the guide press block 550 and the abutting element 543. Specifically, the abutting element 543 is connected to the floating element 541 and passes through the avoidance through hole 530, the guide shaft 542 is connected to the side, away from the tray 700, of the substrate 500, the floating element 541 is in sliding fit with the guide shaft 542, and the second elastic element 544 is configured to push the floating element 541 to move to the substrate 500. In the embodiment, the second elastic element 544 is a spring and is sleeved on the guide shaft 542. One end of the guide shaft 542 is connected to the substrate 500 (e.g., in a screwed manner), the end, away from the substrate 500, of the guide shaft 542 is provided with a limiting part 5421 protruding from a peripheral surface of the guide shaft 542, one end of the second elastic element 544 abuts against the floating element 541 while the other end thereof abuts against the limiting part 5421 on the guide shaft 542. The second elastic element 544, when in a compressed state, tends to move the floating element 541 towards the substrate 500 floating element, so that the abutting element 543 upwardly abuts against the tray 700.

In the embodiment, the abutting element 543 is provided with an ascending position and a descending position relative to substrate 500, and when the tray 700 is free from the limiting of the substrate 500, that is, when the tray 700 is not mounted to the substrate 500, the abutting element 543 is located at the ascending position, and the top of the abutting element 543 is higher than an upper surface of the substrate 500. When the tray 700 is mounted to the substrate 500, that is, when the tray 700 is arranged on the substrate 500, the abutting element 543 is located at the descending position, and the top of the abutting element 543 abuts against the tray 700. The second elastic element 544 tends to move the abutting element 543 to the ascending position.

In the embodiment, a top surface 5431, configured to abut against the tray 700, of the abutting element 543 is a curved surface, optionally, the top surface 5431 may be an arched surface or a spherical surface. The top surface 5431 of this type abuts against the tray 700, so that the contact between the abutting element 543 and the tray is a point contact or a line contact, and during the process of pushing the tray 700 into the slot, the abutting element 543 is easily forced to move to the descending position under the action of press, thereby facilitating the mounting of the tray 700. Furthermore, when the abutting element 543 abuts against the tray 700, it is ensured that the tray 700 may be inclined in a plurality of directions.

In the embodiment, the floating element 541 is provided with two abutting elements 543 spaced apart from each other. The abutting elements 543 may be fixed to the floating element 541 by mounting screws, and the floating element 541 ensures that at least two abutting elements 543 move synchronously. Optionally, the two abutting elements 543 remain at the same height in a state of not being pressed by the tray 700. In other optional embodiments, the number of the abutting elements 543 on the floating element 541 and the fixing manner may be selected as required. Optionally, the abutting element 543 may abut against the flange 730 of the tray 700. Because the bottom of the tray 700 is transparent, the abutting element 543 abutting against the flange 730 avoids the middle area of the bottom of the tray 700 and is difficult to block the light, so as to ensure the light transmittance to the tray 700. Further, the 3D printer in the embodiment may include two floating mechanisms 540. The two floating mechanisms 540 may be provided with a total of four abutting elements 543, and the four abutting elements 543 may respectively abut against four corners of the tray 700.

In the embodiment, the position of the tray 700 in the vertical direction is limited by the guide press block 550 and the abutting element 543 together. In order to increase the upward supporting force of the floating mechanism 540 to the tray 700, optionally, the floating mechanism 540 includes a first magnetic attraction element 545. The substrate 500 is provided with a second magnetic attraction element 560 opposite to the first magnetic attraction element 545. The first magnetic attraction element 545 and the second magnetic attraction element 560 are configured to generate mutual attraction in an energized state, so as to increase the abutting force of the abutting element 543 to the tray 700 to tightly abut against the tray 700. Specifically, in the embodiment, the first magnetic attraction element 545 is an electromagnet, which generates magnetic attraction when being energized. The second magnetic attraction element 560 is a magnet arranged on the lower surface of the substrate 500, and an attraction surface, which faces the magnetic attraction element 545 and is configured to attract the first magnetic attraction element 545, is formed on the magnet. In other optional embodiments, the second magnetic attraction element 560 may also be other parts that may be attracted by the first magnetic attraction element 545, such as an iron sheet attached to the lower surface of the substrate 500, or even a portion, corresponding to the first magnetic attraction element 545, of the substrate 500 is made of iron or iron-based alloy, and the second magnetic attraction element 560 is a part of the substrate 500. In other optional embodiments, the second magnetic attraction element 560 may also be configured as an electromagnet, and the first magnetic attraction element 545 is configured as a magnet or other parts that may be attracted by the electromagnet.

After the tray 700 is mounted in an assembly position (i.e., the position where the tray 700 is located during the subsequent printing process), the first magnetic attraction element 545 is energized to generate the magnetic attraction with the second magnetic attraction element 560, and the abutting element 543 tightly abuts against the tray 700 through the magnetic attraction to prevent the tray from sliding. When the tray 700 needs to be removed, the first magnetic attraction element 545 is de-energized, and then the tray 700 is pulled from the slot formed by the guide press block 550.

In order to ensure a good attraction effect, when the first magnetic attraction element 545 and the second magnetic attraction element 560 attract each other, the alignment area needs to be guaranteed, if they are inclined to each other, they are not well attracted, which results in reduced magnetic attraction and is not conducive to holding the tray 700. Therefore, the floating mechanism 540 in the embodiment further includes an adjusting plate 546, a connection screw 547 and at least two adjusting screws 548. The floating element 541 is provided with a first through hole 5411, the adjusting plate 546 is provided with a second through hole 5461, the adjusting plate 546 is arranged on the side, away from the first magnetic attraction element 545, of the floating element 541, the connection screw 547 passes through the first through hole 5411 and the second through hole 5461, a head of the connection screw 547 is enabled to abut against the adjusting plate 546, the other end of the connection screw 547 is screwed to the first magnetic attraction element 545, the adjusting plate 546 is further provided with adjusting screw holes 5462 in one-to-one correspondence with the adjusting screws 548, and the adjusting screws 548 may abut against the floating element 541 after being screwed to the adjusting screw holes 5462.

It is understandable that, when each adjusting screw 548 abuts against the floating element 541 and the head of the connection screw 547 abuts against the adjusting plate 546, the postures of the adjusting plate 546, the connection screw 547 and the first magnetic attraction element 545 are determined. When the first magnetic attraction element 545 is inclined, the inclined states of the adjusting plate 546 and even the connection screw 547 and the first magnetic attraction element 545 may be adjusted by adjusting the adjusting screws 548, so that the first magnetic attraction element 545 is adjusted to the best posture (i.e., parallel to the attraction surface of the second magnetic attraction element 560), thereby ensuring a better attracting effect. Further, a distance between the adjusting plate 546 and the floating element 541 may also be adjusted by adjusting the adjusting screws 548, thereby adjusting the height of the first magnetic attraction element 545 relative to the floating element 541 when the head of the connection screw 547 abuts against the adjusting plate 546. When the tray 700 is clamped by the abutting element 543 of the floating mechanism 540 and the guide press block 550, the second elastic element 544 is compressed, and the floating element 541 is located at a lower position. After adjusting the adjusting screws 548, the first magnetic attraction element 545 is attached to the second magnetic attraction element 560 after energization, and the head of the connection screw 547 just abuts against the adjusting plate 546. Through the arrangement, the floating element 541 is difficult to float in the vertical direction under the limitation of the second elastic element 544 and the connection screw 547. In other words, in order to make the floating element 541 to move downward, it is necessary to overcome the elastic force of the second elastic element 544 and the magnetic attraction between the first magnetic attraction element 545 and the second magnetic attraction element 560. Therefore, the tray 700 is more stably limited by the floating mechanism 540.

In the embodiment, the side, facing the adjusting plate 546, of the floating element 541 is provided with a limiting groove 5412, and the adjusting screw 548 abuts against the limiting groove 5412. Through the arrangement of the limiting groove 5412, the adjusting plate 546 may not rotate relative to the floating element 541.

In the embodiment, the floating mechanism 540 may further include a third elastic element 549. The elastic element 549 may be arranged between the first magnetic attraction element 545 and the floating element 541, and the third elastic element 549 tends to move the first magnetic attraction element 545 away from the floating element 541, so that even if the first magnetic attraction element 545 is not energized, it abuts against the second magnetic attraction element 560. It is understandable that, the magnetic attraction between the first magnetic attraction element 545 and the second magnetic attraction element 560 decreases sharply with the increase of the distance between the two. Through the arrangement of the third elastic element 549, the first magnetic attraction element 545 always abuts against the second magnetic attraction element 560, so that an attraction force is generated by energizing the first magnetic attraction element 545 and the first magnetic attraction element is tightly attached to the second magnetic attraction element 560. Therefore, the situation that the first magnetic attraction element 545 is too far away from the second magnetic attraction element 560 before being energized, resulting in difficulty in generating enough attraction force after being energized is avoided, and the situation that the first magnetic attraction element 545 is unable to provide enough limiting force for the floating element 541 through enough magnetic attraction is also avoided.

Optionally, the third elastic element 549 is a spring, and sleeved on the connection screw 547.

It is understandable that, in the embodiments of FIG. 20 and FIG. 21, the floating mechanism 540 may omit the first magnetic attraction element 545, the adjusting plate 546, the connection screw 547, the adjusting screw 548 and the third elastic element 549, and the substrate 500 may not be provided with the second magnetic attraction element 560. In this case, the abutting element 543 tightly abuts against the tray 700 through only the elastic force of the second elastic element 544.

Figure 22:
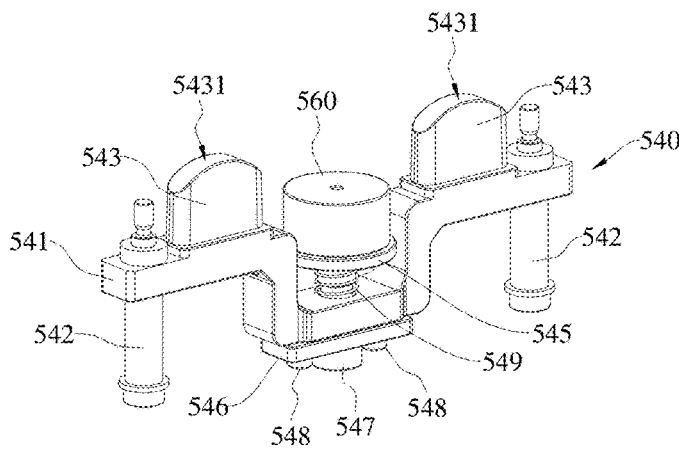
FIG. 22 shows attraction between a floating mechanism and a magnet according to an embodiment of the disclosure.
Figure 23:
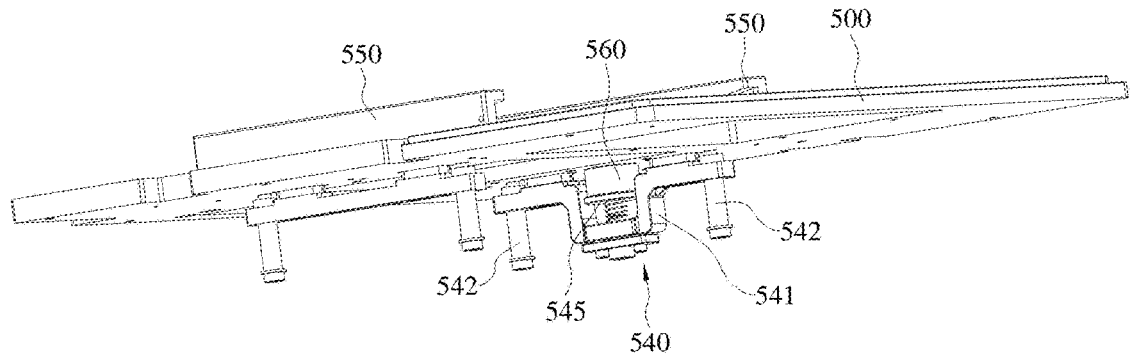
FIG. 23 is an assembly diagram of a substrate and a floating mechanism according to an embodiment of the disclosure.

FIG. 22 shows a floating mechanism 540 attracted to a second magnetic attraction element 560 according to an embodiment of the disclosure, and FIG. 23 is an assembly diagram of a substrate 500 and a floating mechanism 540 according to an embodiment of the disclosure. As shown in FIG. 22 and FIG. 23, in a case where the first magnetic attraction element 545 is arranged, the movement of the abutting element 543 towards the tray 700 does not depend on the second elastic element 544 in the aforementioned embodiments (shown in FIG. 20 and FIG. 21), so that the second elastic element 544 may be omitted in the embodiment. After the tray 700 is mounted at the assembly position, the first magnetic attraction element 545 is energized, the first magnetic attraction element 545 and the connection screw 547 move close to the substrate 500 under the action of the magnetic attraction. The adjusting plate 546 abutting the head of the connection screw 547 and the adjusting screw 548 together move to the substrate, and the adjusting screw 548 abuts against the floating element 541, so as to transfer momentum to the floating element 541, and finally to the abutting element 543, so that the abutting element 543 presses against the tray 700 upward to prevent the tray 700 from sliding. When the tray 700 needs to be removed, the first magnetic attraction element 545 is de-energized, the floating element 541 and the first magnetic attraction element 545 fall down, and then the tray 700 is drawn out.

Figure 24:
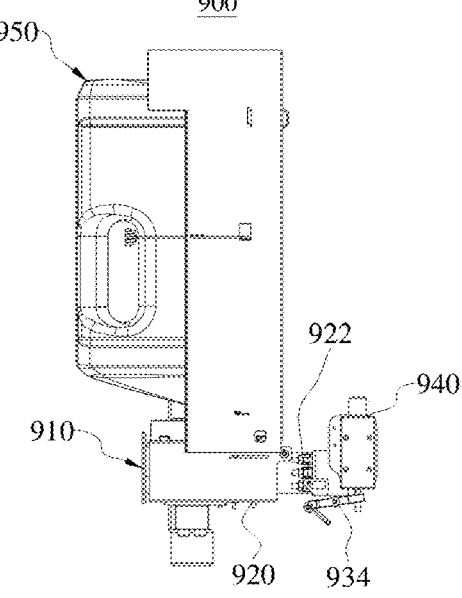
FIG. 24 is a schematic diagram of an automatic liquid adding mechanism in a first perspective according to an embodiment of the disclosure.
Figure 25:
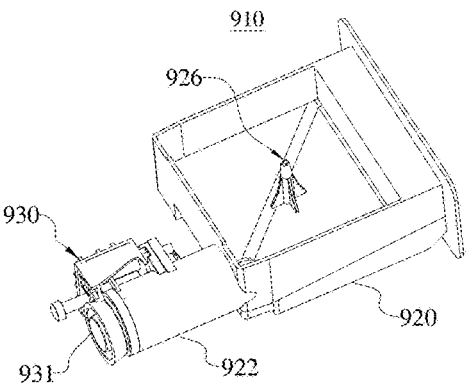
FIG. 25 is a diagram of an assembled transfer liquid adding assembly of an automatic liquid adding mechanism according to an embodiment of the disclosure.
Figure 26:
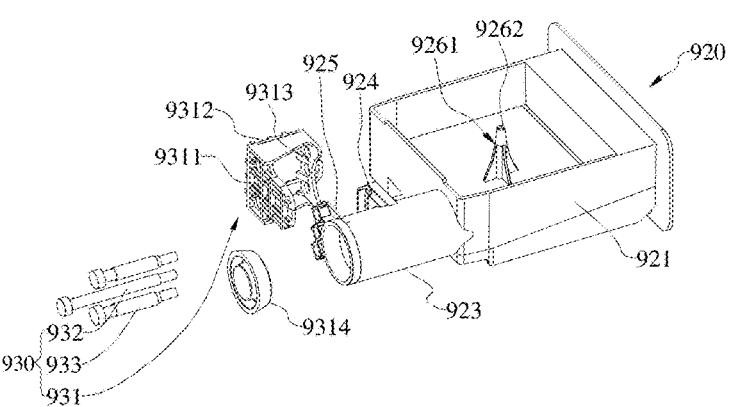
FIG. 26 is an explosion view of a transfer liquid adding assembly of an automatic liquid adding mechanism according to an embodiment of the disclosure.

FIG. 24 is a schematic diagram of an automatic liquid adding mechanism in a first perspective according to an embodiment of the disclosure. Referring to FIG. 24. the printer 010 in the embodiments of the disclosure further includes an automatic liquid adding mechanism 900. The automatic liquid adding mechanism 900 is configured to automatically add the print material to the tray 700. The automatic liquid adding mechanism 900 includes a transfer liquid adding assembly 910, a liquid adding driving assembly 940 and a storage mechanism 950. FIG. 25 is an assembly diagram of a transfer liquid adding assembly of an automatic liquid adding mechanism according to an embodiment of the disclosure, and FIG. 26 is an explosion view of a transfer liquid adding assembly of an automatic liquid adding mechanism according to an embodiment of the disclosure. Referring to FIG. 25 and FIG. 26, the transfer liquid adding assembly 910 includes a feeding box 920 and a locking assembly 930. The feeding box 920 includes a feeding box body 921 and a liquid outlet part 922 configured to add liquid to the tray 700. The liquid outlet part 922 communicates with the feeding box body 921, the feeding box body 921 is configured to store the print material poured by the storage mechanism 950, and the print material stored in the feeding box body 921 flows to the tray 700 through the liquid outlet part 922. The locking assembly 930 is configured to open or block a liquid outlet of the liquid outlet part 922, and the liquid adding driving assembly 940 drives the locking assembly 930 to open or block the liquid outlet part

922 according to the actual liquid level of the tray 700. In a case of ensuring the print material in the feeding box body 921 to be sufficient, the print material is first added to the feeding box 920 of the transfer liquid adding assembly 910 through the storage mechanism 950, and the print material is led to the tray 700 through the liquid outlet part 922, so as to ensure that the feeding speed of material from the feeding box 920 to the tray 700 is in a stable state, thereby achieving the stability in controlling the feeding speed.

It is understandable that, after the transfer liquid adding assembly 910 is applied to the 3D printer 010, the print material in the storage mechanism 950 first flows into the feeding box body 921, and does not directly lead to the tray 700, so as to avoid the problem of incapability of stably controlling the feeding speed caused by the gradual change of the feeding speed of the print material in the storage mechanism 950 after consumption, thereby avoiding the problem of insufficient or excessive print materials in the tray 700 caused by the unstable feeding speed, which may results in failure in 3D printing or waste of the print material. The automatic liquid adding mechanism 900 provided by the embodiment ensures the amount of the print materials in the tray 700, which improves the success rate of printing.

In one embodiment, the locking assembly 930 includes a blocking element 931 and a fourth elastic element (not shown in the figure). The blocking element 931 may move in an axis direction of the liquid outlet part 922. The fourth elastic element applies a force to the blocking element 931, so that the blocking element 931 abuts against the liquid outlet of the liquid outlet part 922 according to the elastic force of the fourth elastic element.

The blocking element 931 may be of a structure capable of blocking the liquid outlet in any form, such as a baffle plate, a soft plug. The relative positional relationship and connection relationship between the blocking element 931 and the feeding box 920 may be any one, as long as the blocking element 931 may move in the axis direction of the liquid outlet part 922. For example, a guide channel may be arranged in the axis direction of the liquid outlet part 922, and the blocking element 931 may move in the guide channel to achieve the movement in the axis direction of the liquid outlet part 922. The blocking element 931 abuts against the liquid outlet under the action of the elastic force of the fourth elastic element, so as to block the liquid outlet. It is to be noted that, the arrangement position and number of the fourth elastic element are not specifically defined herein, as long as the elastic force towards the liquid outlet is applied to the blocking element 931. Further, the elastic force may be generated by compression of the spring or by stretching of the spring.

In a specific example, the locking assembly 930 further includes a slider 932. The blocking element 931 is slidably connected to the slider 932, and the slider 932 is fixedly connected to an outer surface of the liquid outlet part 922.

Specifically, an axis direction of the slider 932 is parallel to the axis direction of the liquid outlet part 922. The slider 932 is fixed to the outer surface of the liquid outlet part 922. For example, the slider 932 may be connected to the outer surface of the liquid outlet part 922 through two fixed supports, thereby being fixed to the outer surface of the liquid outlet part 922. Further, the blocking element 931 may be sleeved on the slider 932 to move in the axis direction of the liquid outlet part 922.

The liquid adding driving assembly 940 is configured to drive the blocking element 931 to slide relative to the slider 932, and the fourth elastic element is connected to the feeding box 920 and the blocking element 931 at the same time. In other words, the feeding box 920 and the blocking element 931 are connected to the fourth elastic element, and the blocking element 931 blocks the liquid outlet part 922 through a preset elastic force of the fourth elastic element 931. It is understandable that, in the embodiment, the blocking element 931 blocks the liquid outlet part 922 through the preset elastic force of the fourth elastic element 931, that is, the liquid outlet of the liquid outlet part 922 is in a normally closed state.

The liquid adding driving assembly 940 is able to drive the locking assembly 930 to open or block the liquid outlet of the liquid outlet part 922 according to the actual liquid level of the tray 700. For example, when the automatic liquid adding mechanism 900 in the embodiment is applied to the 3D printer 010, the printer 010 detects that the liquid level of the print material on the tray 700 is lower than a preset liquid level, the liquid adding driving assembly 940 is able to drive the blocking element 931 to move away from the liquid outlet part 922, and then the print material flows to the tray 700 through the liquid outlet part 922. When the liquid level of the print material in the tray 700 is higher than or equal to the preset liquid level, the liquid adding driving assembly 940 acts to move the blocking element 931 close to the liquid outlet part 922 under the acting force of the fourth elastic element and block the liquid outlet of the liquid outlet part 922.

In the embodiment, the liquid adding driving assembly 940 is an electromagnet push rod. Specifically, when the electromagnet push rod is energized, a push rod of the electromagnet push rod is able to stretch or retract, so that the blocking element 931 moves away from or close to the liquid outlet part 922, thereby opening or blocking the liquid outlet part 922. When the electromagnet push rod is in a de-energized state, the push rod of the electromagnet push rod is in a retracted state, so that the blocking element 931 blocks the liquid outlet part 922 under the action of the preset elastic force of the fourth elastic element. Therefore, when the automatic liquid adding mechanism 900 is applied to the 3D printer 010, in the de-energized state, the push rod of the electromagnet push rod is retracted, and the liquid outlet part 922 is in a blocked state, thereby avoiding adding the liquid to the tray 700 in the de-energized state and avoiding the waste of the print material.

Of course, in other embodiments, the liquid adding driving assembly 940 is not limited to the electromagnet push rod, as long as the liquid adding driving assembly 940 ensures that the blocking element 931 is driven to move away from or close to the liquid outlet part 922 in the energized state, so as to open or block the liquid outlet part 922, and ensures that the liquid outlet part 922 is in a blocked state in the de-energized state. No specific limits are made to the liquid adding driving assembly 940 herein.

The liquid outlet part 922 includes a discharge pipe 923 communicating with the feeding box body 921, and a first fixed support 924 arranged on a side wall of the discharge pipe 923. The slider 932 is fixedly connected to the first fixed support 924. The blocking element 931 includes an abutting part 9313 and a baffle plate 9311 connected to the abutting part 9313. The baffle plate 9311 is configured to block the discharge pipe 923, and the abutting part 9313 and baffle plate 9311 are respectively arranged on both sides of the first fixed support 924. In one specific example, the first fixed support 924 is arranged on an outer side wall of the discharge pipe 923. It is to be noted that both sides of the first fixed support 924 refer to both sides of the first fixed support 924 in the axis direction of the liquid outlet part 922. The transfer liquid feeding assembly 910 further includes a fastener. In the embodiment, the fastener is a bolt 933, the abutting part 9313 is connected to the first fixed support 924 through the fastener (i.e., the bolt 933), and the fourth elastic element is sleeved on the fastener and both ends of the fourth elastic element abut against the first fixed support 924 and the abutting part 9313, respectively. When the fourth elastic element is in a compressed state, the baffle plate 9311 blocks the liquid outlet of the discharge pipe 923 under the action of the elastic force of the fourth elastic element.

In the embodiment, the side, close to the discharge pipe 923, of the baffle plate 9311 is further provided with a sealing plug 9314, configured to block the discharge pipe 923, which further enhances the reliability of blocking the discharge pipe 923 by the blocking element 931.

Referring to FIG. 24, the transfer liquid adding assembly 910 further includes a transmission rod 934. The transmission rod 934 is configured to push the abutting part 9313 by an external acting force, so that the baffle plate 9311 moves away from the liquid outlet. The transmission rod 934 may be a transmission rod of any structure in the field. In one specific example, the transmission rod 934 is a rotating rod configured to be rotatably connected to a rack of the 3D printer 010 (not shown in the figure), one end of the rotating rod is configured to receive an external driving force, so that the other end rotates to push the abutting part 9313, and then the baffle plate 9311 moves away from the discharge pipe 923. It is understandable that, in the embodiment, the electromagnet push rod is able to drive one end of the transmission rod 934 to rotate, which in turn drives the other end to rotate, thereby pushing the abutting part 9313 to move the baffle plate 9311 away from the liquid outlet of the discharge pipe 923.

Specifically, when the liquid adding driving assembly 940, i.e., the push rod of the electromagnet push rod in the embodiment, is stretched, one end of the transmission rod 934 is pushed to rotate, and the other end of the transmission rod 934 rotates accordingly to push the abutting part 9313, so that the blocking element 931 slides on the slider 932 to move the baffle plate 9311 away from the discharge pipe 923 to open the discharge pipe. When the push rod of the electromagnet push rod is retracted, one end of the transmission rod 934 rotates reversely while the other end thereof rotates accordingly, and under the action of the preset elastic force of the fourth elastic element, the baffle plate 9311 moves in the direction close to the discharge pipe 923 until the liquid outlet of the discharge pipe 923 is blocked.

In some other embodiments, the discharge pipe 923 is further provided with a rotating shaft and a connecting rotating plate. An axis of the rotating shaft is perpendicular to an axis of the discharge pipe 923, the rotating shaft is arranged on the first fixed support 924 and the connecting rotating plate is rotatably connected to it, and the connecting rotating plate is configured to rotate by an external acting force to push the blocking element away from the liquid outlet. Further, the connecting rotating plate has a first connecting part and a second connecting part. The first connecting part is configured to receive the external driving force, i.e., the driving force of the liquid adding driving assembly 940, to drive the second connecting part to move to push the baffle plate 9311 away from the discharge pipe 923. It is understandable that, the liquid adding driving assembly 940 makes the second connecting part drive the connecting rotating plate to rotate through the rotating shaft, and then moves the baffle plate 9311 away from or close to the discharge pipe 923 through the first connecting part, so as to open or block the discharge pipe 923.

In some other embodiments, the liquid adding driving assembly 940 may move the baffle plate 9311 away from or close to the discharge pipe 923 through other mechanical structures, which is not limited to the above configurations, as long as the mechanical structure is able to convert the driving force of the liquid adding driving assembly 940 into the force of moving the baffle plate 9311 away from or close to the discharge pipe 923, which is not specifically limited herein.

Further, the side wall of the discharge pipe 923 further includes a second fixed support 925. The second fixed support 925 is arranged on the side wall of the discharge pipe 923, and the first fixed support 924 and the second fixed support 925 are respectively arranged on both sides of the abutting part 9313, specifically on both sides of the abutting part 9313 in the axis direction of the liquid outlet. The blocking element 931 further includes a connecting plate 9312. The connecting plate 9312 is connected to the abutting part 9313 at an angle, the connecting plate 9312 is connected to the baffle plate 9311 at an angle, the first fixed support 924 and the second fixed support 925 are fixedly connected to the slider 932, and the abutting part 9313 is slidably connected to the slider 932. Through the cooperation of the second fixed support 925 and the first fixed support 924, the slider 932 and the discharge pipe 923 are more stable. In one specific example, the second fixed support 925 is arranged on the outer side wall of the discharge pipe 923.

In the embodiment, the slider 932 is a sliding rod, the fourth elastic element is a spring (not shown in the figure), the fastener is the bolt 933, the bolt 933 and the sliding rod pass through the first fixed support 924, the abutting part 9313 and the second fixed support 925, and the spring is sleeved on the bolt 933. It is understandable that, the first fixed support 924 and the second fixed support 925 are fixedly connected to the sliding rod, the abutting part 9313 is located between the first fixed support 924 and the second fixed support 925, the baffle plate 9311 is configured to block the discharge pipe 923, the abutting part 9313 and the baffle plate 9311 are in sliding fit with the sliding rod, the bolt 933 passes through the baffle plate 9311, the second fixed support 925, the abutting part 9313 and the first fixed support 924 at the same time to realize the connection through the bolt 933, and both ends of the spring respectively abut against the first fixed support 924 and the abutting part 9313. Then the baffle plate 9311 blocks the discharge pipe 923, so that the discharge pipe 923 is in the normally closed state. It is to be noted that, the number of the fourth elastic elements and the bolts is not specifically limited here, and may be two or more.

In other embodiments, the aforementioned locking assembly 930 further includes a second baffle plate and a fifth elastic element which are connected. One end of the fifth elastic element abuts against the second baffle plate while the other end thereof abuts against the blocking element. The fifth elastic element abuts against the blocking element by applying a preset elastic force, the second baffle plate is located on the side, away from the liquid outlet part, of the blocking element, and the second baffle plate is connected to the liquid outlet part. The fifth elastic element in the embodiment is configured to be distinguished from the fourth elastic element in other embodiments, and the second baffle plate is configured to be distinguished from the baffle plate 9311 in other embodiments.

Specifically, one end of the fifth elastic element abuts against the second baffle plate while the other end thereof abuts against the baffle plate, the fifth elastic element abuts against the baffle plate with the preset elastic force to apply a force of the discharge pipe 923 to the baffle plate, the second baffle plate is located on the side, away from the discharge pipe 923, of the baffle plate, and the second baffle plate is connected to the discharge pipe 923. It is understandable that, the second baffle plate is connected to the baffle plate through the fifth elastic element, so that the fifth elastic element is in a compressed state, that is, the second baffle plate and the discharge pipe 923 compress the fifth elastic element such that the fifth elastic element apply a force to the baffle plate 9311 to block the discharge pipe 923. It is understandable that, the baffle plate 9311 not only makes the baffle plate 9311 block the discharge pipe 923 through the preset elastic force applied by the fourth elastic element, but also presses the baffle plate 9311 on a pipe mouth of the discharge pipe 923 through the preset elastic force applied by the fifth elastic element, thereby achieving the better sealing property between the baffle plate 9311 and the discharge pipe 923.

The liquid adding driving assembly 940 is electrically connected to a controller, and at least one of a liquid level sensor, a position sensor or a gravity sensor electrically connected to the controller, and the controller is configured to control the action of the liquid adding driving assembly 940. Optionally, the controller may be the above-mentioned control mechanism, or integrated into the control mechanism of the printer 010, or a structure specifically configured to control the liquid adding driving assembly 940.

The liquid level sensor is configured to detect the actual liquid level of the tray 700 of the 3D printer 010 and transmit it to the controller. In one specific example, when the liquid level sensor detects that the actual liquid level of the tray 700 is lower than a preset liquid level, the liquid adding driving assembly 940 drives the baffle plate 9311 away from the discharge pipe 923. Specifically, the liquid level sensor may specifically include any of the following sensors: an impedance sensor, a capacitance sensor and a laser sensor. The gravity sensor is configured to detect the actual weight of the storage mechanism 950.

Figure 27:
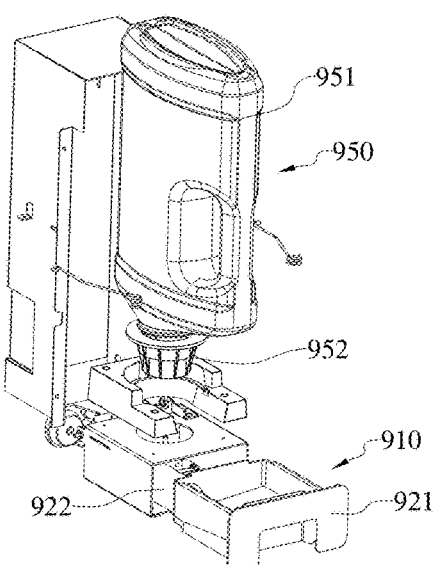
FIG. 27 is a schematic diagram of an automatic liquid adding mechanism in a second perspective according to an embodiment of the disclosure.

FIG. 27 is a schematic diagram of an automatic liquid adding mechanism in a second perspective according to an embodiment of the disclosure. In conjunction with FIG. 27, in the embodiment, the feeding box 920 further includes a fool-proofing element 926. The fool-proofing element 926 is arranged in an accommodating cavity of the feeding box body 921. The storage mechanism 950 includes a check valve 952 and a liquid storage bottle 951 communicating with a liquid inlet of the check valve 952. When the transfer liquid adding assembly 910 is assembled to the printer 010, a first height at which a lower bottom surface of the storage mechanism 950 of the printer 010 is located is less than a second height of the end, away from the feeding box body 921, of the fool-proofing element 926, and the end, away from the feeding box body 921, of the fool-proofing element 926 is located in the check valve 952. Specifically, one end of the fool-proofing element 926 may extend into the storage mechanism 950, which may achieve any of the above effects. In the embodiment, the fool-proofing element 926 includes a positioning hole 9261 and a positioning pin 9262. The positioning hole 9261 is connected to the positioning pin 9262, and the positioning hole 9261 is arranged in the accommodating cavity of the feeding box body 921. A first end of the positioning pin 9262 is arranged in the positioning hole 9261, and a second end extends from the liquid outlet of the check valve 952 into an inner space of the check valve 952. The height of the bottom of the check valve 952 of the printer 010 is lower than that of the end, away from the feeding box 920, of the fool-proofing element 926, that is, the height of the end, away from the feeding box 920, of the positioning pin 9262 is higher than that of the bottom of the check valve 952, so as to prevent taking out the transfer liquid adding assembly 910 without removing the storage mechanism 950. In other words, when the printer 010 is provided with a storage mechanism 950 connected to a check valve 952 and the height of the bottom of the check valve 952 is lower than that of the end, away from the feeding box 920, of the positioning pin 9262, the transfer liquid adding assembly 910 is prevented from being removed from the printer 010, that is, when the transfer liquid adding assembly 910 is loaded into the 3D printer 010 in a horizontal direction, the storage mechanism 950 is subsequently loaded, and at this time, the height of the bottom of the check valve 952 is lower than that of the end, away from the feeding box 920, of the positioning pin 9262, so that if the storage mechanism 950 is not removed from the 3D printer 010, the operator cannot remove the transfer liquid adding assembly 910, which plays an fool-proofing role.

It is understandable that, in order to mount the check valve 952 and the liquid storage bottle 951, the 3D printer 010 is further provided with a mounting seat for mounting the check valve 952. In the embodiment, after the check valve 952 and the liquid storage bottle 951 are assembled on the mounting seat, the positioning pin 9262 pulls a valve body of the check valve 952, and then opens a passage of the storage mechanism 950 to the feeding box 920. When the storage mechanism 950 is removed, the valve body is closed to prevent leakage. Further, after the positioning pin 9262 ejects the valve body, when the liquid level in the feeding box body 921 reaches the check valve 952, the print material in the liquid storage bottle 951 will not continue to flow downward into the feeding box body 921 due to gravity.

Figure 30:
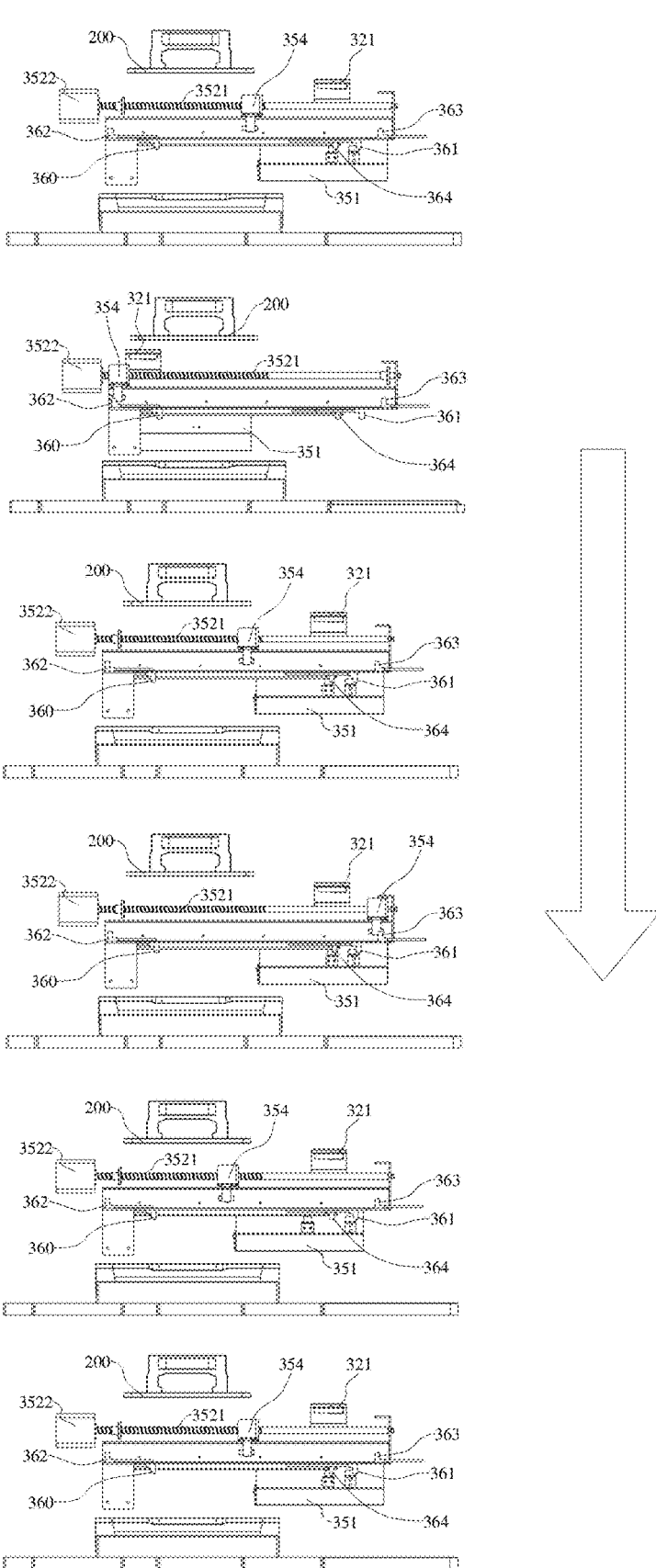
FIG. 30 is a schematic diagram of different postures of an object shoveling mechanism in different stages during an object shoveling process according to an embodiment of the disclosure.

FIG. 28 is a flowchart of a 3D printing method according to an embodiment the disclosure, and FIG. 30 shows different postures of an object shoveling mechanism at some moments during an object shoveling process according to an embodiment of the disclosure. Further referring to FIG. 28 and FIG. 30, the embodiments of the disclosure further provide a 3D printing method, applied in the 3D printer 010 provided by the embodiments of the disclosure. The 3D printing method may include the following operations.

At S100, a carrying element is controlled to move to an object receiving position.

In the embodiments of the disclosure, the carrying element 351 may be located in a waiting position when a printed object 020 has not been completely printed, as shown in a first step in FIG. 30. At this time, the carrying element 351, an object moving element 354 and a shoveling tool 321 are located outside a printing area of the printer 010, so that a printing operation is not affected. After printing is completed, a control mechanism may control an object shoveling driving assembly 330 to drive the carrying element 351 to move to the object receiving position (as shown in a second step in FIG. 30) to receive the printed object 020 falling from a forming surface 210. In the embodiment, a prerequisite for starting object shoveling is to move the carrying element 351 to the object receiving position, and whether the carrying element 351 moves to the object receiving position may be determined by detecting whether the object moving element 354 reaches an initial position of the object moving element 354 through an object receiving position sensor 362.

At S200, a forming platform and the shoveling tool are controlled to approach each other, and a pressure between the shoveling tool and the forming surface is obtained.

Before object shoveling, in addition to moving the carrying element 351 to the object receiving position to prepare for material receiving, it is necessary to tightly attach the shoveling tool 321 to the forming surface 210 to prepare for sliding of the shoveling tool 321 on the forming surface 210. Taking the printer 010 provided by the embodiments of the disclosure as an example, a control mechanism may control a platform driving mechanism 800 and the object shoveling driving assembly 330 to respectively drive the forming platform 200 and the shoveling tool 321 to move, so that they approach each other. In some other embodiments, one of them may also be controlled to move while the other keeps stationary, for example, the shoveling tool 321 is controlled to approach the forming platform 200. In the embodiment, because the forming platform 200 moves in a first direction and the shoveling tool 321 moves in a second direction, the first direction is perpendicular to the second direction, and the first direction is a vertical direction, the process of the forming platform 200 and the shoveling tool 321 approaching each other is that the shoveling tool 321 moves toward the forming platform below the forming platform 200 and the forming platform 200 moves downward.

As shown in FIG. 29, in order to make safer contact and press between the forming platform 200 and the shoveling tool 321, S200 optionally includes the following steps.

At S210, the forming platform and the shoveling tool are controlled to approach each other in a first movement mode.

At S220, before the shoveling tool is in contact with the forming surface, the forming platform and the shoveling tool are controlled to approach each other in a second movement mode, and the pressure between the shoveling tool and the forming surface is continuously obtained.

An approach speed between the forming platform 200 and the shoveling tool 321 in the second movement mode is less than an approach speed between the forming platform 200 and the shoveling tool 321 in the first movement mode. It may be seen that the speed is relatively high when approaching each other in the first movement mode, which is conducive to quickly moving in place and improving the operating efficiency. However, approaching too fast is prone to cause the shoveling tool 321 to impact the forming platform 200, resulting in damage to a device, so that before the shoveling tool 321 is in contact with the forming surface 210, the forming platform 200 and the shoveling tool 321 are controlled to approach each other in the second movement mode, at this time, there is a relatively small approach speed. In the second movement mode, the pressure between the shoveling tool 321 and the forming surface 210 is continuously obtained, the relatively slow approach speed may ensure more accurate pressure detection, and the relative movement between the shoveling tool 321 and the platform may be stopped in time after the pressure reaches a threshold, so as to prevent the damage to the shoveling tool 321 caused by the excessive pressure between the two.

Further, the step of controlling the forming platform 200 and the shoveling tool 321 to approach each other in the first movement mode may specifically include the following operation.

The shoveling tool 321 is controlled to move from an initial position of the shoveling tool 321 to a tool pressing position, and the forming platform 200 is controlled to move toward the shoveling tool 321 at a first speed in the first direction. The tool pressing position is located on the side, facing the tray 700, of the forming platform 200 in the first direction.

In the embodiment, because the initial position of the shoveling tool is not located under the forming platform 200, it is necessary to move the shoveling tool 321 to the tool pressing position, i.e. under the platform, and wait for the forming platform 200 to fall. Optionally, the printer 010 may include a sensor configured to detect whether the shoveling tool 321 reaches the tool pressing position. The sensor may be a photoelectric sensor, and the object shoveling driving assembly 330 is controlled to stop driving when the sensor detects that the shoveling tool 321 moves to the tool pressing position. After the shoveling tool 321 moves to the tool pressing position, the forming platform 200 is controlled to fall in the first direction (i.e., the vertical direction in the embodiment), or the forming platform 200 is controlled to fall when the shoveling tool 321 move toward the tool pressing position. Further, the step of controlling the forming platform 200 and the shoveling tool 321 to approach each other in the second motion mode may specifically include: controlling the forming platform 200 to move toward the shoveling tool 321 at a second speed in the first direction. The second speed is less than the first speed.

In optional embodiments of the disclosure, before the step of controlling the forming platform 200 and the shoveling tool 321 to approach each other in the first movement mode, the 3D printing method may further include: controlling the forming platform 200 to move to an initial position of the platform. The initial position of the platform is a limit position, farthest from the shoveling tool 321, of the forming platform 200 in the first direction. In the embodiment, the initial position of the platform is an uppermost limit position of the forming platform 200. This position is a position reached by the forming platform 200 when being lifted from the tray 700 after one-time printing is completed.

In one embodiment, the step of controlling the forming platform 200 to move to the shoveling tool 321 at the first speed in the first direction may specifically include: controlling the forming platform 200 to move a first distance to the shoveling tool 321 at the first speed in the first direction. The first distance is less than a distance between the forming platform 200 located at the initial position of the platform and the shoveling tool 321 in the first direction, that is, less than a distance between the initial position of the platform and the tool pressing position in the first direction. The first distance is a preset distance. When the platform driving mechanism 800 drives the forming platform 200 to fall the first distance from the initial position of the platform, it means that the platform reaches a position where it needs to be switched to the second speed. At this time, the descending speed is switched, that is, the second movement mode is applied.

In another embodiment, the step of controlling the forming platform 200 to move toward the shoveling tool 321 at the first speed in the first direction may specifically include: controlling the forming platform 200 to move toward the shoveling tool 321 at the first speed in the first direction, and detecting whether the forming platform 200 reaches a speed change position, wherein the speed change position is located between the shoveling tool 321 and the initial position of the platform; and in a case of determining that the forming platform 200 reaches the speed change position, controlling the forming platform 200 to stop moving to the shoveling tool 321 at the first speed. Optionally, the printer 010 may include a sensor configured to output a corresponding sensing signal to the control mechanism after the forming platform 200 moves to the speed change position, and the control mechanism controls the forming platform 200 to stop moving toward the shoveling tool 321 at the first speed according to the sensing signal. The operation of controlling the forming platform 200 to stop moving toward the shoveling tool 321 at the first speed may include: controlling the forming platform 200 to pause the movement and wait for the next stage of moving toward the shoveling tool 321 at a relatively slow second speed; or directly controlling the movement speed of the forming platform 200 to switch to the second speed. The speed change position may be a position to which the forming platform 200 moves the preset distance at the first speed.

At S300, in a case where the pressure between the shoveling tool and the forming surface reaches a pressure threshold, the forming platform and the shoveling tool are stopped from approaching each other.

During the descending process of the forming platform 200, the pressure sensor continuously detects the pressure between the shoveling tool 321 and the forming surface 210. If it is detected that the pressure reaches the pressure threshold, it means that there is sufficient pressure between the forming platform 200 and the shoveling tool 321 for object shoveling, so that the forming platform 200 may be controlled to stop moving, thereby stopping the forming platform 200 and the shoveling tool 321 from approaching each other, and avoiding the damage to the shoveling tool 321 or the forming platform 200 caused by the excessive pressure. The pressure threshold may be a preset pressure value.

Optionally, in the step of controlling the forming platform 200 to move toward the shoveling tool 321 at the second speed in the first direction, if the pressure between the shoveling tool 321 and the forming surface 210 after the forming platform 200 descends the second distance still does not reach the pressure threshold, the forming platform 200 is controlled to stop moving. The process of the forming platform 200 moving toward the shoveling tool 321 at the second speed in the first direction may be regarded as a tool pressing process. If the pressure between the shoveling tool 321 and the forming surface 210 still does not reach the pressure threshold after the forming platform 200 descends the sufficient distance (such as the second distance in the embodiment) during the tool pressing process, an abnormality may exist, for example, the shoveling tool 321 does not move to the tool pressing position, or the shoveling tool 321 has been damaged, or the pressure sensor fails. At this time, in order to avoid further damage to the device, the forming platform 200 may be controlled to stop moving, and the abnormal situation is checked.

It is understandable that, in the embodiments of the disclosure, S100 may be executed before or after S200 or S300, or may be executed simultaneously with S200 or S300.

At S400, the shoveling tool is controlled to slide on the forming surface to strip the printed object from the forming surface to the carrying element.

S400 is an object shoveling step. When the pressure between the forming surface 210 and the shoveling tool 321 reaches the pressure threshold, the shoveling tool 321 is controlled to advance in the second direction (an edge 3211 is forward), so that the printed object 020 is stripped from the forming surface 210. Further, S400 specifically includes: controlling the shoveling tool 321 to slide on the forming surface 210 and detecting whether the shoveling tool 321 reaches a termination position of the shoveling tool 321; and in a case of detecting that the shoveling tool 321 reaches the termination position of the shoveling tool 321, controlling the shoveling tool 321 to stop moving. It may be seen that, after the shoveling tool 321 slides on the forming surface 210 in the second direction, the shoveling tool 321 reaches the terminal position of the shoveling tool 321. At this time, the control mechanism receives an in-place signal of a first sensor 360, and the control mechanism controls the object shoveling driving assembly 330 to stop driving, and finally the shoveling tool 321 reaches a position shown in the second step in FIG. 30. Optionally, if it is still not detected that the shoveling tool 321 reaches the termination position of the shoveling tool 321 after a first duration from the time the shoveling tool 321 slides on the forming surface 210, the shoveling tool 321 may be controlled to stop moving. The first duration may be set as required, for example, 10 s, 15 s or 20 s. If it is still not detected that the shoveling tool 321 reaches the termination position of the shoveling tool 321 after the first duration from the time the shoveling tool 321 slides on the forming surface 210, an abnormality may occur, for example, the first sensor 360 fails or the object shoveling driving assembly 330 is damaged, so that driving may be stopped and the abnormality may be checked.

In the embodiment, the shoveling tool 321 is controlled to move to the initial position of the shoveling tool 321 after the printed object 020 is separated from the forming surface 210. Specifically, after the object shoveling step, the control mechanism controls the shoveling tool 321 to move to the initial position of the shoveling tool 321, and stops the movement of the shoveling tool 321 when receiving an initial sensing signal of the shoveling tool 321 output by a second sensor 361. At the same time, the forming platform 200 may also be controlled to return to the initial position of the platform. Specifically, the forming platform 200 is controlled to move to the initial position of the platform, and the movement of the forming platform 200 is stopped when the in-place signal output by the sensor is received.

At S500, the carrying element receiving the printed object is controlled to leave the object receiving position.

In the embodiments of the disclosure, after the carrying element 351 receives the printed object, the printed object needs to be removed to avoid interfering with the next printing operation. In the embodiment, the carrying element 351 is provided with an unloading position. S500 specifically includes: controlling the carrying element 351 receiving the printed object to move from the object receiving position to the unloading position. In the embodiment, an object moving element 354 and the carrying element 351 are connected through magnetic attraction, and in the step of controlling the carrying element 351 receiving the printed object 020 to move from the object receiving position to the unloading position, an object receiving driving assembly 352 may be controlled to drive the object moving element 354 to move, and under the action of the magnetic attraction with the carrying element 351, the object moving element 354 drives the carrying element 351 to move from the object receiving position to the unloading position. In the embodiment, when the carrying element 351 moves to the unloading position, it stays at the unloading position due to blocking of a limiting element, as shown in a third step in FIG. 30.

After the carrying element 351 moves to the unloading position, the 3D printing method may further include the following operation.

At S600, the printed object received by the carrying element is unloaded at the unloading position.

According to the printer 010 provided based on the embodiments of the disclosure, when the carrying element 351 reaches the unloading position, the object receiving driving assembly 352 may drive the object moving element 354 to move from the side, away from a unloading opening 3511, of the carrying element 351 towards the unloading opening 3511, so as to pull the printed object 020 accommodated in an object receiving space out of the unloading opening 3511. In the embodiment, after the carrying element 351 abuts against the limiting element, the object moving element 354 is driven to overcome the magnetic attraction with the carrying element 351 and move towards the unloading opening 3511, so as to pull the printed object 020 out of the unloading opening 3511. When an object moving element 3541 of the object moving element 354 is a soft object moving element, a liquid print material in the object receiving space may also be pulled out of the unloading opening when the printed object 020 is pulled out of the unloading opening. Further, the object moving element 354 reaches an object moving completion position after the printed object 020 is pulled out of the unloading opening 3511. The 3D printing method in the embodiment further includes: controlling the object moving element 354 to stop moving when determining that the object moving element 354 reaches the object moving completion position. Specifically, when the object moving element 354 moves to the object moving completion position, an object moving completion sensor 363 outputs an object moving completion sensing signal to the control mechanism, so that the control mechanism controls the object moving element 354 to stop moving, and the object moving element 354 and the carrying element 351 reach the position shown in a fourth step in FIG. 30.

At S700, the object moving element is driven to move, so as to drive the carrying element to move to the waiting position and stop moving.

In the embodiment, the carrying element 351 is further provided with the waiting position spaced apart from the object receiving position. The waiting position is located outside a printing area of the 3D printer 010. After the printed object 020 received by the carrying element 351 is unloaded at the unloading position, based on the printer 010 in the embodiment, the operation of controlling the carrying element 351 to move to the waiting position includes: controlling the object receiving driving assembly 352 to drive the object moving element 354 to move from the object moving completion position to the end, away from the unloading opening 3511, of the carrying element 351 in a direction away from the unloading opening 3511 of the carrying element 351, and contact the carrying element 351, and stopping moving after moving it together with the carrying element 351 to the waiting position. The waiting position is a position where the carrying element 351 waits for receiving the printed object, the efficiency of moving from the waiting position to the object receiving position for material receiving is relatively high, and the position is located outside the printing area without affecting the printing operation, and after the completion of printing, the carrying element 351 moves to the object receiving position. Therefore, the step of controlling the carrying element 351 to the object receiving position specifically includes: controlling the carrying element 351 to move from the waiting position to the object receiving position.

In one embodiment, the waiting position of the carrying element 351 is located between the object receiving position and the unloading position. In another optional embodiment, the waiting position coincides with the unloading position. The object moving element 354, after completing material pulling, needs to move in a direction away from the unloading opening 3511 of the carrying element 351 in the second direction, so as to contact the end, away from the unloading opening 3511, of the carrying element 351 for preparing for driving the carrying element 351 to move to the object receiving position during next object receiving of the object receiving assembly 350. It is to be noted that, when the object moving element 354 moves to be in contact with the carrying element 351, the carrying element 351 may move a distance towards the object receiving position and enter the printing area due to the action of the magnetic attraction and the abutting action of the object moving element 354, so that the printing operation of the printer 010 may be affected, as shown in the fifth step in FIG. 30. Therefore, in this case, after being in contact with the carrying element 351, the object moving element 354 also needs to be driven by the object receiving driving assembly 352 to drive the carrying element 351 to move a distance away from the object receiving position in the second direction, so as to reach the waiting position and present a posture shown in a sixth step in FIG. 30. In the sixth step in FIG. 30, the posture of an object shoveling mechanism 300 is the same as that in the first step, and the carrying element 351 is located at the waiting position. At this point, the carrying element 351 completes a complete object receiving process.

In the embodiment, a carrying element sensor 364 is configured to output a waiting sensing signal to the control mechanism when the carrying element 351 reaches the waiting position, and the control mechanism controls the object receiving driving assembly 352 to stop driving according to the waiting sensing signal.

In the embodiment, a storager 400 may be configured to receive the printed object 020 unloaded from the carrying element 351. Further, in order to remind an operator to take the printed object 020 in time after the storager 400 is full, and avoid the printed object 020 falling out of the storager 400, the 3D printing method further includes: detecting whether the storager 400 is full; and in a case of detecting that the storager 400 is full, controlling the output of a full-piece prompt message. The full-piece prompt message may be a voice prompt message, and/or a picture or text prompt message. Accordingly, the printer 010 may contain a speaker, a display screen, and other interactive mechanisms configured to output the full-piece prompt message.

Similarly, the shoveling tool 321, when the object moving element 354, the carrying element 351 and the forming platform 200 are judged to be abnormal during the operation, for example, the pressure between the shoveling tool 321 and the forming surface 210 still does not reach the pressure threshold after the above-mentioned forming platform 200 descends the second distance, or it is still not detected that the shoveling tool 321 reaches the termination position of the shoveling tool 321 after the shoveling tool 321 slides on the forming surface 210 for the first duration, the prompt message may also be sent, so that the operator detects and checks the abnormality.

Further, the 3D printing method in the disclosure may further include an automatic liquid adding method, specifically, which may automatically add the print material to a tray 700 by controlling an automatic liquid adding mechanism under certain conditions. The automatic liquid adding mechanism may be the same as or different from the automatic liquid adding mechanism in the above-mentioned embodiments, and a liquid adding manner thereof may be gravity liquid adding, pumping liquid adding, etc., which is not limited herein, as long as automatic liquid adding is achieved.

In an embodiment, the print material is added to the tray 700 by the automatic liquid adding mechanism before one-time printing of the printer 010. Of course, in the embodiment, a liquid adding operation is not limited to be performed before each printing. For example, whether liquid adding is needed may be determined at least based on factors such as the amount of the print materials in the tray 700.

Specifically, in a case where liquid adding is needed, if an object shoveling operation does not need to be performed before one-time printing, the liquid is added directly, and a 3D printing operation may be performed after liquid adding is completed. If the object shoveling operation needs to be performed before one-time printing, the automatic liquid adding may be performed simultaneously with the object shoveling operation, or before or after the object shoveling operation is completed, which is not limited herein.

In a case where the object shoveling operation needs to be performed, the automatic liquid adding mechanism may be controlled to add the liquid after the previous printing is completed (at this time, a lighting mechanism has stopped irradiating). Specifically, the liquid adding may be started when the forming platform 200 starts to ascend, or may be started when the forming platform 200 ascends and reaches the initial position of the platform, or may also be started when the shoveling tool 321 starts to move from the initial position of the shoveling tool, the shoveling tool 321 moves to the tool pressing position, the tool pressing is completed, the shoveling tool 321 starts to perform object shoveling, the shoveling tool 321 moves to the termination position of the shoveling tool, the carrying element 351 moves to the unloading position and other nodes, as long as the automatic liquid adding may be completed before or simultaneously with the object shoveling operation is completed, which is not specifically limited herein.

In the embodiment, the start of the automatic liquid adding may be further determined according to a liquid level of the print material in the tray 700, that is, after reaching the above time node, the liquid level is further detected, and the liquid adding is performed when the liquid level meets the liquid adding requirement, for example, when the liquid level reaches and/or is lower than a preset liquid level. The termination of the automatic liquid adding may be determined according to at least one of the liquid level of the print material in the tray 700, an estimated amount of the print materials required for a printed object to be printed, etc., for example, when the liquid level reaches and/or is higher than another preset liquid level, or when the added amount is equal to or greater than the estimated amount of the print materials required for the printed object, the liquid adding may be stopped.

In an application scenario, before one-time printing, an initial liquid level of the print material in the tray 700 may be detected by a liquid level sensor and fed back to the control mechanism. When it is detected that the initial liquid level of the print material in the tray 700 is lower than a first target liquid level, the automatic liquid adding mechanism is controlled to add the print material to the tray 700, and during the process of adding the print material to the tray, the liquid level of the print material in the tray 700 is detected in real time or at a predetermined time interval through the liquid level sensor, and fed back to the control mechanism. When it is detected that the liquid level of the print material in the tray 700 reaches a second target liquid level, the automatic liquid adding mechanism is controlled to stop adding the print material to the tray 700, so as to complete the automatic liquid adding. The first target liquid level may be lower than the second target liquid level.

In addition, the first target liquid level may also coincide with the second target liquid level. In this case, the liquid adding may be controlled when it is detected that the liquid level is lower than the preset low/high liquid level, and the liquid adding may be stopped when the liquid level rises to the preset low/high liquid level.

In another application scenario, the automatic liquid adding mechanism is the automatic liquid adding mechanism 900 in the aforementioned embodiment. At this time, before one-time printing, the step of performing automatic liquid adding may include the following operations.

At S20, printed object information and the first liquid level of the print material in the tray 700 are obtained.

Specifically, the printed object information may include parameters of the printed object, such as the number of printing layers, a printing time, slicing data, process parameters, etc. The printed object information may be directly retrieved from a memory of the printer 010, or obtained in other manners. In addition, the first liquid level may be obtained by the above liquid level sensor, or may be obtained in other manners.

At S30, in a case where a first liquid adding condition is met currently, the type of the print material is determined according to the printed object information, and a liquid adding parameter is determined according to the type of the print material. The liquid adding parameter includes a liquid adding duration. The first liquid adding condition includes that the first liquid level is less than a first preset value.

Specifically, in a case where the first liquid level is less than the first preset value, it indicates that the liquid adding needs to be performed. At this time, the type of the print material is determined according to the printed object information, and the liquid adding parameter is selected according to the type of the print material. It is to be noted that, a one-to-one correspondence between the type of the print material and the liquid adding parameter may be preset, so that the liquid adding parameter may be determined after the type of the print material is determined.

At S40, a liquid adding driving assembly 940 is controlled to drive a blocking element 931, so that a liquid outlet is in an open state to add the print material to the tray 700 and a duration of remaining in the open state reaches the liquid adding duration.

Specifically, the current position of the forming platform 200 may be obtained first. When it is detected that the forming platform 200 reaches the initial position of the platform, the liquid adding driving assembly 940 may be controlled to drive the blocking element 931, so that the liquid outlet is in the open state. Moreover, after the duration of remaining the liquid outlet in the open state reaches the above liquid adding duration, the liquid adding driving assembly 940 is controlled to drive the blocking element 931, so that the liquid outlet is switched to a blocked state.

Of course, in the application scenario, before determining the type of the print material according to the printed object information, S10 may further be provided: obtaining the current weight of a storage mechanism 950 of the 3D printer; the first liquid adding condition further includes that the current weight is greater than a second preset value.

When the current weight of the storage mechanism 950 is lower than the second preset value, a replacement prompt may be issued to facilitate the operator to replace the storage mechanism 950 in time, so as to ensure the amount of the print materials in a feeding box 920. The current weight of the storage mechanism 950 may be obtained by receiving weight information transmitted by the above gravity sensor.

In addition, in one specific example, S50 is provided after the step of controlling the liquid adding driving assembly 940 to drive the blocking element 931 to ensure that the liquid outlet is in the open state and the duration of remaining in the open state reaches the liquid adding duration. S50:

obtaining a second liquid level of the tray 700; and sending a prompt signal when the second liquid level is lower than the preset liquid level.

It is understandable that, the prompt message is sent to report errors through this step, which facilitates the operator to check fault information of the printer 010, for example, when the first liquid level is lower than the preset liquid level, blockage may occur at a liquid outlet part 922.

It is to be noted that, the automatic liquid adding method in the application scenario may be adapted to the requirements for liquid adding during printing with different materials. In addition, in a case where a flow rate of the from the feeding box 920 to print material the tray 700 is stable, the precise control of the print material in the tray 700 may be achieved, which further improves the success rate of printing and avoids the waste of the print material.

In another embodiment, the print material is added to the tray 700 by the automatic liquid adding mechanism during the printing process of the printer 010. It is understandable that, in the embodiment, the liquid adding operation is not limited to be performed during each printing process, but may be determined according to the liquid level of the print material in the tray 700, the printing requirements, etc.

In the embodiment, the printing may be paused first when the liquid adding operation is performed, including that the platform driving mechanism 800 pauses driving the forming platform 200, the lighting mechanism pauses the radiation, etc., and then the automatic liquid adding mechanism is controlled to add the liquid, and printing is performed after the liquid adding is completed, or the print material in the tray 700 is further stable, so that even if the liquid is added during the printing process, the printing quality is not adversely affected by disturbing the print material in the tray 700.

Further, the start of the automatic liquid adding may be determined according to the liquid level and print data of the print material in the tray 700, for example, when the liquid level reaches and/or is lower than the preset liquid level, or after the previous liquid adding, print data such as the consumption of the print materials consumed by the printing operation, the number of printed layers, the height of the printed object that has been printed, the volume of the printed object that has been printed, etc. The termination of the automatic liquid adding may be determined according to at least one of the liquid level of the print material in the tray 700, an estimated amount of the print materials required for a printed object to be printed, etc., for example, when the liquid level reaches and/or is higher than another preset liquid level, or when the added amount is equal to or greater than the estimated amount of the print materials required for the printed object, the liquid adding may be stopped.

In an application scenario, during the printing process, the liquid level of the print material in the tray 700 may be detected in real time or at every predetermined time interval through the liquid level sensor, and fed back to the control mechanism. When it is detected that an initial liquid level of the print material in the tray 700 is lower than a first target liquid level, printing is paused, then the automatic liquid adding mechanism is controlled to add the print material to the tray 700, and during the process of adding the print material to the tray 700, the liquid level of the print material in the tray 700 is detected in real time or at every predetermined time interval through the liquid level sensor, and fed back to the control mechanism. When it is detected that the liquid level of the print material in the tray 700 reaches a second target liquid level, the automatic liquid adding mechanism is controlled to stop adding the print material to the tray 700, so as to complete the automatic liquid adding, and then printing is continued. The first target liquid level may be lower than the second target liquid level.

In addition, the first target liquid level may also coincide with the second target liquid level. In this case, the liquid adding may be controlled when it is detected that the liquid level is lower than the preset low/high liquid level, and the liquid adding may be stopped when the liquid level rises to the preset low/high liquid level.

In another application scenario, the target liquid level of the tray 700 may be preset. During the printing process, the print data, such as at least one of the number of printing layers, the printing height, the printing volume (i.e., the volume of the printed object that has been printed) or the consumption of the print materials may be obtained. When a corresponding value of the print data reaches a preset value, for example, when the printer prints a predetermined number of layers or a predetermined height of the printed object or consumes a preset amount of print materials, or the estimated volume of the printed object that has been printed reaches the maximum consumption of a single consumption of the print materials (the maximum consumption may be preset, so as not to exhaust the print material in the tray 700 during the printing process), printing may be paused, then the automatic liquid adding mechanism is controlled to add the print material to the tray 700, and during the process of adding the print material to the tray 700 by the automatic liquid adding mechanism, the liquid level of the print material in the tray 700 is detected in real time or at every predetermined time interval through the liquid level sensor, and fed back to the control mechanism. When it is detected that the liquid level of the print material in the tray 700 reaches the target liquid level, the automatic liquid adding mechanism is controlled to stop adding the print material to the tray 700, so as to complete the liquid adding, and then printing is continued after the liquid adding is completed.

In the application scenario, the number of the printing layers, the printing height, the printing volume and the consumption of the print materials refer to the number of the printed layers, the printed height of the printed object, the printed volume of the printed object, the consumption of the print materials, etc., during the one-time printing process from the latest automatic liquid adding after this printing, or the number of the printed layers, the printed height of the printed object, the printed volume of the printed object, the consumption of the print materials, etc., from this printing in a case where automatic liquid adding is not performed after this printing. Of course, in other application scenarios, it may also refer to the cumulative number of the printing layers, the cumulative printing height, the cumulative printing volume, the cumulative consumption of the print materials, etc., which is not limited herein. In addition, the printing volume may be estimated according to the corresponding slice data of the printed object that has been printed, for example, the corresponding volume may be obtained according to the area of each slice layer and the corresponding layer thickness.

It is to be noted that, in the application scenario, the preset target liquid level may be a relatively low liquid level. Specifically, a specific position of the preset target liquid level is not limited in the application scenario, and the target liquid level may be set according to the shape and size of the tray 700 and the influence of other related parts of the printer 010. In the application scenario, the amount of the print materials corresponding to the target liquid level may be less than the total consumption of the print materials in the printing process, that is, it is not sufficient for the required amount for one-time printing of the printer 010, so that automatic liquid adding needs to be performed during the printing process. In addition, in other application scenarios, the amount of the print materials corresponding to the liquid level may also satisfy the consumption for printing once or multiple times. For example, when the consumption of one-time printing may be satisfied, the print material may be added before the next printing, and the amount at this time may be added through monitoring the liquid level.

It is understandable that, if the liquid level of the print material in the tray 700 is relatively high, the consumption of the print material needs printing for a long time, so that part of the print material has a possibility of being in contact with the external light for a relatively long time before being printed and consumed, and is more prone to be unnecessary cured and deteriorated to a certain extent. Therefore, residues are generated in the print material of the tray 700, which affects the printing quality. In the application scenario, because the liquid level is relatively low, the automatic liquid adding mechanism is controlled by the control mechanism, so that the print material in the tray 700 is always at a relatively low liquid level, which reduces the contact between the print material in the tray 700 and the external light, thereby greatly reducing the probability of unnecessary curing of the print material caused by the contact with the external light, reducing the possibility of the residues in the tray 700, and then reducing the risk of the adverse impact on the printing quality.

In addition, the automatic liquid adding method in the embodiment may perform liquid adding by referring to a manner of determining the liquid adding duration according to the printed object information in the previous embodiment, but only the time node for liquid adding is different. Referring to the above embodiment for details, which will not be elaborated herein.

In various liquid adding manners, the control mechanism may obtain the liquid level of the print material in the tray 700 through the liquid level sensor. The liquid level sensor may specifically include any of the following sensors: an impedance sensor, a capacitance sensor and a laser sensor.

In summary, the 3D printing method provided by the disclosure may include: controlling the forming platform 200 and the shoveling tool 321 to approach each other, and obtaining the pressure between the shoveling tool 321 and the forming surface 210; when the pressure between the shoveling tool 321 and the forming surface 210 reaches the pressure threshold, stopping the forming platform 200 and the shoveling tool 321 from approaching each other; and controlling the shoveling tool 321 to slide on the forming surface 210 to strip the printed object from the forming surface 210. The 3D printing method realizes the automatical operations of stripping the printed object from the forming platform 200, receiving the printed object, unloading the printed object at the unloading position, and storing in the storager 400. After the printing is completed, the whole process of the operations such as object shoveling, object receiving and object storage is automatically achieved, so that the printing efficiency is improved, the printing operation is performed unattended, and the labor cost is reduced. The pressure between the shoveling tool 321 and the forming surface 210 is detected, and the object shoveling is performed when the pressure threshold is reached, so that the better object shoveling effect is ensured, and the damage to the device is avoided. In addition, the method avoids the contamination to the human body or the device caused by manual object shoveling.

The object shoveling mechanism 300 provided by the disclosure includes the object shoveling assembly 310 and the object receiving assembly 350. The object shoveling assembly 310 is configured to strip the printed object from the forming surface 210. The object receiving assembly 350 is configured to receive the printed object stripped from the forming surface 210 at the object receiving position and move the printed object from the object receiving position. The 3D printer 010 provided by the disclosure includes the forming platform 200, the platform driving mechanism 800 and the object shoveling mechanism 300. The forming platform 200 is provided with the forming surface 210. The forming surface 210 is configured for attachment of the printed object, and the platform driving mechanism 800 is configured to drive the forming platform 200 to move. The pressure sensor is configured to obtain the pressure between the shoveling tool 321 and the forming surface 210. The 3D printer 010 provided by the disclosure implements the above 3D printing method, and therefore also has the beneficial effects of being high in operation efficiency and stable in quality of a printing product, and reducing the contamination of the print material to the human body or the device. At the same time, the printing operation is performed unattended, and the labor cost is reduced.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subjected to the scope of protection of the claims.

INDUSTRIAL APPLICABILITY

According to an object shoveling mechanism, an object shoveling method and a 3D printer provided by the disclosure, the whole process of automatical operations such as object shoveling, object receiving and object storage is achieved, so that the printing efficiency is improved, a printing operation is performed unattended, and the labor cost is reduced. In addition, the 3D printer is stable in quality of a printing product and reduces the contamination of a print material to a human body or a device.

What is claimed is:

1. A 3D printer, comprising:
a tray configured to accommodate a printing material;
a forming platform having a forming surface and configured for attachment of a printed object; and
an object shoveling mechanism; located between the tray and the forming platform, wherein the object shoveling mechanism comprises:
an object shoveling assembly, comprising:
a shoveling tool configured to remove the printed object from the forming surface; and
an object shoveling driving assembly configured to drive at least one of the shoveling tool and the forming platform such that the shoveling tool and the forming platform move relative to each other to remove the printed object from the forming surface through the shoveling tool; and
an object receiving assembly, comprising:
a movable carrying element provided with an object receiving position and configured to receive the printed object removed from the forming surface at the object receiving position; and an object receiving driving assembly configured to drive the movable carrying element to move to the object receiving position.

2. The 3D printer according to claim 1, further comprising a storager, wherein the storager is provided with a storage space configured to accommodate the printed object, and the storager is configured to receive the printed object unloaded from the movable carrying element.

3. The 3D printer according to claim 2, further comprising a substrate, wherein the substrate is provided with an opening, so that the printed object unloaded from the movable carrying element drops, through the opening of the substrate, into the storager.

4. The 3D printer according to claim 1, further comprising:
a substrate having an avoidance through hole and provided with a guide press block on a surface thereof, wherein the guide press block and the substrate define a slot for inserting the tray; and
a floating mechanism comprising an abutting element and a second elastic element, wherein the abutting element is arranged at the avoidance through hole, and the second elastic element is configured to push the abutting element to move towards the guide press block.

5. The 3D printer according to claim 4, wherein the floating mechanism further comprises a floating element and a guide shaft, the abutting element is connected to the floating element, the guide shaft is connected to the substrate, the floating element is in sliding fit with the guide shaft, and the second elastic element is configured to push the floating element and the abutting element connected to the floating element to move towards the substrate.

6. The 3D printer according to claim 4, further comprising at least one tag and at least one reader, wherein the tag is selected from at least one of a platform tag, a tray tag or a shoveling tool tag, and the reader is selected from at least one of a platform reader, a tray reader or a shoveling tool reader.

7. The 3D printer according to claim 1, further comprising an automatic liquid adding mechanism, wherein the automatic liquid adding mechanism comprises a transfer liquid adding assembly comprising:
a feeding box comprising a feeding box body and a liquid outlet part, wherein the liquid outlet part communicates with the feeding box body; the feeding box body is configured to receive the printing material flowing out of an external storage mechanism;
a locking assembly comprising a blocking element and a fourth elastic element, wherein the blocking element is movable in a direction of an extension axis of the liquid outlet part; the fourth elastic element is configured to apply a force to the blocking element, so that the blocking element abuts against a liquid outlet of the liquid outlet part based on an elastic force of the fourth elastic element; and
a liquid adding driving assembly configured to drive the blocking element to open or block the liquid outlet.

8. The 3D printer according to claim 7, wherein the transfer liquid adding assembly further comprises a fool-proofing element, the fool-proofing element comprises a positioning hole and a positioning pin, the positioning hole is connected with the positioning pin, and the positioning hole is arranged in an accommodating cavity of the feeding box body.

9. The 3D printer according to claim 1, wherein the movable carrying element is further provided with an unloading position;

the object receiving driving assembly is further configured to drive the movable carrying element to move to the unloading position, and the object receiving assembly is further configured to unload the printed object at the unloading position.

10. The 3D printer according to claim 9, wherein the movable carrying element is provided with an object receiving space configured to accommodate the printed object and an unloading opening communicating with the object receiving space;

the object receiving assembly further comprises any one of an object moving element or a rotating assembly, wherein at least a part of the object moving element is arranged in the object receiving space, the object receiving driving assembly is further configured to drive the object moving element to move towards the unloading opening when the movable carrying element is located at the unloading position, so as to unload the printed object accommodated in the object receiving space through the unloading opening; and the rotating assembly is configured to turn over the movable carrying element at the unloading position to unload the printed object accommodated in the object receiving space.

11. The 3D printer according to claim 10, wherein the object moving element comprises a first element, the movable carrying element comprises a second element magnetically coupled to the first element, the object shoveling mechanism further comprises a limiting element used for limiting a movement of the movable carrying element, and the object receiving driving assembly is further configured to drive the object moving element so that the object moving element and the movable carrying element move from the object receiving position to the unloading position, and drive the object moving element so that the object moving element moves away from the object receiving position from the unloading position.

12. The 3D printer according to claim 9, wherein the movable carrying element is further provided with a waiting position spaced apart from the object receiving position, wherein the waiting position is located between the object receiving position and the unloading position, or the waiting position coincides with the unloading position.

13. The 3D printer according to claim 1, wherein the object shoveling driving assembly is configured to drive the shoveling tool to move between a termination position of the shoveling tool and an initial position of the shoveling tool.

14. The 3D printer according to claim 1, wherein the shoveling tool is a shovel blade with a knife edge, and the knife edge of the shovel blade is an arc-shaped knife edge.

15. The 3D printer according to claim 14, wherein the object shoveling assembly further comprises a tool holder and an adjusting assembly, the shovel blade is mounted on the tool holder, the tool holder is pivotally mounted on a sliding seat of the object shoveling driving assembly, the adjusting assembly is configured to adjust an inclination angle of the shovel blade relative to the forming surface, the adjusting assembly comprises a first elastic element, one end of the first elastic element abuts against the tool holder, and the other end of the first elastic element abuts against the sliding seat.

16. The 3D printer according to claim 15, wherein the adjusting assembly further comprises an adjusting element, the adjusting element is in threaded engagement with the sliding seat and extends through the tool holder, the first elastic element is arranged between the tool holder and the sliding seat and is sleeved on the adjusting element, and the adjusting element is further provided with a head for limiting a movement of the tool holder.

17. A 3D printing method, comprising:

controlling a carrying element of an object receiving assembly of an object shoveling mechanism of a 3D printer to move to an object receiving position, wherein the 3D printer further comprises a tray configured to accommodate a printing material and a forming platform, the forming platform has a forming surface and configured for attachment of a printed object, the object shoveling mechanism is located between the tray and the forming platform;

driving at least one of a shoveling tool of an object shoveling assembly of the object shoveling mechanism or the forming platform, so that the shoveling tool and the forming platform move relative to each other, and removing a printed object from a forming surface of the forming platform;

receiving the printed object by the carrying element; and controlling the carrying element receiving the printed object to move away from the object receiving position.

18. The 3D printing method according to claim 17, wherein said removing comprising:

acquiring a pressure between the shoveling tool and the forming platform; and stopping driving any one of the shoveling tool and the forming platform when the pressure reaches a pressure threshold value.

19. The 3D printing method according to claim 18, wherein said acquiring the pressure comprising:

controlling the shoveling tool to move from an initial position of the shoveling tool to a tool pressing position, wherein the tool pressing position is located on a side of the forming platform in a first direction;

controlling the forming platform to move from an initial platform position to the tool pressing position of the shoveling tool at a first speed in the first direction;

after the forming platform moves a preset distance at the first speed, controlling the forming platform to move towards the shoveling tool at a second speed in the first direction, and continuously obtaining the pressure between the shoveling tool and the forming platform; and when the pressure reaches the pressure threshold value, controlling the forming platform to stop moving, wherein the preset distance is less than a distance between the initial platform position and the tool pressing position in the first direction, and the second speed is less than the first speed.

20. The 3D printing method according to claim 17, comprising:

controlling the carrying element receiving the printed object to move from the object receiving position to an unloading position; and unloading the printed object borne by the carrying element at the unloading position.

21. The 3D printing method according to claim 20, wherein, at the unloading position:

driving an object moving element of the object receiving assembly of the object shoveling mechanism, so as to push out the printed object on the carrying element; or driving a rotating assembly of the object receiving assembly of the object shoveling mechanism, so that the printed object in the carrying element drops off.

22. The 3D printing method according to claim 21, further comprising:

moving the carrying element from the unloading position to a waiting position, and the carrying element staying at the waiting position for a first time period, wherein the waiting position is spaced apart from the object receiving position; and moving the carrying element from the waiting position to the object receiving position.

23. The 3D printing method according to claim 17, further comprising:

obtaining an initial liquid level of a printing material in a tray of a 3D printer, and when the initial liquid level is lower than a first target liquid level, adding the printing material into the tray and obtaining the liquid level of the printing material in the tray, and when the liquid level reaches a second target liquid level, stopping adding the printing material, wherein the first target liquid level coincides with the second target liquid level, or the first target liquid level is lower than the second target liquid level.

24. The 3D printing method according to claim 17, further comprising:

obtaining printing data, wherein the printing data comprises at least one of a number of printing layers, a printing height, a printing volume or a consumption of the printing material; and when a value corresponding to the printing data reaches a preset value, adding the printing material into the tray and obtaining the liquid level of the printing material in the tray, and when the liquid level reaches a target liquid level, stopping adding the printing material into the tray.

25. The 3D printing method according to claim 17, wherein the 3D printer further comprises an automatic liquid adding mechanism, the automatic liquid adding mechanism is provided with a liquid outlet and comprises a blocking element and a driving mechanism, and the 3D printing method further comprises: controlling the driving mechanism to move the blocking element, so as to allow the printing material to flow from the liquid outlet of the automatic liquid adding mechanism to the tray of the 3D printer.

* * * * *